United States Patent
Huang et al.

(10) Patent No.: US 6,477,543 B1
(45) Date of Patent: Nov. 5, 2002

(54) METHOD, APPARATUS AND PROGRAM STORAGE DEVICE FOR A CLIENT AND ADAPTIVE SYNCHRONIZATION AND TRANSFORMATION SERVER

(75) Inventors: Yun-Wu Huang, Mount Kisco; Philip Shi-lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/178,100

(22) Filed: Oct. 23, 1998

(51) Int. Cl.[7] .............................................. G06F 13/00
(52) U.S. Cl. ..................... 707/200; 707/201; 709/203
(58) Field of Search ................................. 709/203, 105; 707/201, 200

(56) References Cited

U.S. PATENT DOCUMENTS

| | | | | |
|---|---|---|---|---|
| 5,729,735 A | * | 3/1998 | Meyering | 707/10 |
| 5,757,669 A | * | 5/1998 | Christie et al. | 709/205 |
| 5,884,323 A | * | 3/1999 | Hawkins et al. | 707/201 |
| 5,884,324 A | * | 3/1999 | Cheng et al. | 707/201 |
| 5,943,676 A | * | 8/1999 | Boothby | 707/201 |
| 6,044,381 A | * | 3/2000 | Boothby et al. | 707/201 |
| 6,098,076 A | * | 8/2000 | Rekieta et al. | 707/202 |

\* cited by examiner

Primary Examiner—Kenneth R. Coulter

(74) Attorney, Agent, or Firm—David M. Shofi; Anne Vachon Dougherty

(57) ABSTRACT

A sync proxy or sync server logic, process and apparatus employing sync logic and/or transformation codes distributed in the network to increase the scalability and improve the manageability of synchronization between a client such as: an Internet appliance; a handheld or palmtop device; a smart phone or intelligent pager; and their remote replica sources. An example of an adaptive sync server for synchronizing data between a client and a remote host replica, which stores a replica of data on the client includes sync acceptor logic for identifying a replica host and a sync logic which is application specific to a data type associated with the client and the remote host; wherein the sync logic can be located anywhere on a network remote to the sync server and the remote host, in response to a sync request; and sync handler logic, coupled to the sync acceptor logic, for retrieving remote sync logic from the network, connecting to the remote host, and synchronizing the data between the client and the remote host using the retrieved sync logic. The sync request could explicitly (or by default) identify the replica host and the sync logic or could include an address of a directory service storing information for identifying the replica host and the sync logic. The sync request could also or alternatively include information for identifying a (local or remote) device specific transformation code for converting data between the client and the remote host during synchronization; and means for retrieving the transformation code based on the information and converting the data between the client and the remote host based on the device specific transformation code.

110 Claims, 13 Drawing Sheets

METHOD, APPARATUS AND PROGRAM STORAGE DEVICE FOR A CLIENT AND ADAPTIVE SYNCHRONIZATION AND TRANSFORMATION SERVER

FIELD OF THE INVENTION

The present invention relates generally to an update synchronization and/or transformation process between data in a client and replicas of the data in information management systems.

BACKGROUND

With the rapid advancement of semiconductor, storage and display technologies, handheld or mobile devices, which may only be occasionally connected to the network, have become increasingly popular. The ways that mobile devices such as 3Com's PALM PILOT™ are being used have also become very versatile. For example, a PALM PILOT™ user may have an e-mail application that is to be synchronized with a Lotus NOTES™ e-mail system in an office desktop. There may also be a stock quote application in the PALM PILOT™ which gets updated by synchronizing with a well-known stock quote site located in the Internet. There may also be a PALM PILOT™ expense application that is to be synchronized with home PC finance software. Therefore, it is quite possible that various handheld applications within one device need to synchronize with different applications in various information management systems (such as Lotus NOTES™, Microsoft EXCHANGE™, file systems, relational databases, object-oriented databases) running on networked computers. It is also possible that one handheld application (such as e-mail) has different versions for different handheld devices (e.g., PALM PILOT™, Sharp's ZAURUS™, Psion PLC's PSION™ and various other palmtop devices running Microsoft WINDOWS CE™).

Because handheld devices such as PALM PILOTs™ are typically only occasionally connected to the network with the connection lasting only a short time, it is critical that the synchronization processes between the applications in the handhelds and their counterparts in various networked computers be very efficient (so that the synchronization process can be successfully completed while the handhelds are connected to the network). With the handheld devices typically offering less CPU power and less memory for computation, the synchronization processes are usually not conducted inside the handheld devices.

Here, a computer hosting the replicas of data from handheld devices is called a replica host, or replica source. Because handheld devices generally have less computing power and memory than a replica host, the handheld devices typically conduct synchronization inside their replica hosts, which are desktop PCs. Typically, synchronization is first initiated by pushing a handheld device button (e.g., the HotSync button in a PALM PILOT™). Immediately after the button is pushed, a synchronization manager software in the replica host (e.g., PALM PILOT's™ HotSync Manager in the desktop personal computer (PC) takes over the synchronization process. In the case of a PALM PILOT™, the HotSync Manager conducts synchronization for a PALM PILOT™ application by executing an application-specific program (called Conduit in the PALM PILOT™) which synchronizes this application between the PALM PILOT™ and a desktop PC through application-specific logic. If multiple applications need to be synchronized, the HotSync Manager executes each of their corresponding Conduits in sequential order. Based on this approach, synchronization is always conducted between one PC and one handheld device. Simultaneous synchronization between multiple handheld devices and one PC is not available.

In general, conducting synchronization processes directly in the replica host is very limiting. The reason is that there may exist many applications (such as e-mail, calendar, address book) that each can be shared by many different handheld devices (e.g., PALM PILOT™, ZAURUS™, PSION™). Each application may require a different synchronization logic for each different device. To process synchronization for all applications and all devices properly, a replica host may need to install and manage many different versions of the synchronization processes in order to handle different handheld devices. Thus, conducting synchronization processes in the replica hosts creates a heavy burden in management of the different handheld devices and their synchronization processes. For many replica hosts, their most mission-critical task is not to synchronize with various handhelds, but to run as an information server such as a database server, a groupware server, or as a personal desktop computing device. Running synchronization on them therefore detracts from their mission-critical tasks.

A more efficient approach to management synchronization between multiple handheld devices and replica hosts is to deploy synchronization proxies (or synchronization (sync) servers, or synchronization proxy servers, or simply sync proxies) that maintain persistent network connections, to conduct synchronization on behalf of both the handhelds and the replica hosts (devices hosting the replicas also maintain a persistent network connection).

To synchronize, a handheld first establishes a network connection. Once connected, instead of making a direct connection to the targeted replica host for synchronization, it makes a synchronization request to a sync proxy. Upon receiving such a request, the sync proxy establishes a connection to the targeted replica host and starts the synchronization process by issuing input/output requests to both the handheld and its replica host. A straightforward design of the synchronization proxy is for the proxy to maintain all device-specific and application-specific synchronization programs that can handle all the handheld device types and all the information management system types hosted by the replica hosts. This means that each application must have an unique synchronization program written specifically for any combination between all the handheld device types and all the information management systems hosting the replicas of handheld data. For example, a synch proxy may maintain four different synchronization programs for an e-mail application in order to support both PALM PILOT™ and WINDOWS CE™ based handheld devices and both Microsoft EXCHANGE™ and Lotus NOTES™ e-mail systems for PCs. The first synchronization program is for synchronizing between PALM PILOT™ and EXCHANGE™, the second between PALM PILOT™ and Lotus NOTES™, the third between WINDOWS CE™ and EXCHANGE™, and the fourth between WINDOWS CE™ and Lotus NOTES™.

Another aspect of this straightforward design of the sync proxy is to allow the synchronization input/output interface between the synchronization proxy and a specific information management system hosting replicas of handheld data to be the same for different handheld devices. It is the sync proxy that handles the differences between handheld devices, not each replica host. The actual synchronization processes are conducted by the synchronization proxies. The role of both the handhelds and the replica hosts during synchronization is simply to respond to the synchronization input/output calls made by the synchronization proxy. These calls are typically in the form of adding, retrieving, deleting, and updating information. The computation burden and complexity of the synchronization logic for both handhelds and replica hosts therefore is much reduced.

One important feature of this straightforward sync proxy approach is that in order to properly synchronize between any applications for all device types and any information management systems for all replica hosts, a sync proxy must be able to invoke, during a synchronization task, a specific synchronization logic based on the target application, device, and the information management system. The current straightforward sync proxy approach accomplishes this by first restricting its support to a small number of applications, devices and information management systems to reduce the total number of synchronization logic variations required for proper synchronization; and by pre-configuring the synchronization logic as dynamically linkable (during synchronization runtime) codes stored in its disk memory. An important issue of such an approach is the difficulty in the management of all the various synchronization logic. If more applications, devices, and management information systems are supported by an organization, the number of sync logic variations increases dramatically. Each sync proxy therefore must be able to link the right sync logic. Furthermore, in an organization with multiple sync proxies deployed, any changes and updates to a sync logic creates a difficult software management task of propagating these changes and updates to the right files of all sync proxies. The improvement of the management of the synchronization logic is one focus of the present invention.

Another feature of the current straightforward sync proxy approach is that the various synchronization logic are pre-coded by the makers of the sync proxies, some of which also provide a development platform for users to augment or modify the synchronization logic. The Sync proxy makers do not generally create the applications, the devices, or the information management systems. Thus, they do not have the expert knowledge of this software and hardware and must limit the scope of their support. The scalability of current sync proxies in terms of supporting more handheld applications, more handheld devices, and more management information systems is very limited. The present invention addresses this limitation.

Furthermore, the straightforward sync proxy is a standa-lone system whose scalability in terms of processing simul-taneous sync requests is limited by the computing power of the machine on which the sync proxy is installed. No collaboration between sync proxies in terms of load balanc-ing is available in the straightforward sync proxy approach. This lack of collaboration between sync proxies may poten-tially create unbalanced loading among proxies which causes some sync requests to be delayed or not serviced. The present invention addresses this need.

SUMMARY

In accordance with the aforementioned needs, the present invention is directed to an improved method, apparatus and program storage device for a synchronization proxy (or sync proxy or sync server) that serves as an intermediary and a computation platform in performing update synchronization between clients, examples of which include but are not limited to: an Internet appliance; a handheld or palmtop device; a smart phone or intelligent pager; and information management systems that host the replicas of data from these devices. The clients may be disconnected from the network some or most of the time while the information management systems remain connected almost all the time. The data in the client devices and/or their replicas in the information management systems may be updated indepen-dently of each other.

According to the present invention, a method is provided for a client to request synchronization services from a sync proxy. For example, a handheld device issues a synchroni-zation request (or sync request) to this proxy. A sync request may involve one or more applications to be synchronized. After the sync request is accepted, the sync proxy processes synchronization for all applications requested to be synchro-nized for this handheld device in a sequential fashion. For each application to be synchronized, the handheld may provide a sync identifier which may include the name of the application to be synchronized, the ID of the replica host for this application, the ID of the program with application specific synchronization logic for this application (sync logic), and the ID of the program with a device specific data transformation method for this handheld device (transformation code). The IDs preferably includes a unique identifier (or a unique name) and a network address from which this information can be retrieved.

Alternatively, during the sync processing of an application, instead of the handheld device sending the information directly to the sync proxy, the handheld device may send a sync identifier which may only include some identification information of the user, the handheld device, and the application to be synchronized, as well as the address of a directory service in which the name of the application and the aforementioned three pieces of informa-tion (i.e., the ID of the replica host for this application, the ID of the sync logic for this application, and the ID of the transformation code for this handheld device) is stored.

An example of an adaptive sync server for synchronizing data between a client and a remote host replica, which stores a replica of data on the client, having features of the present invention includes: sync acceptor logic for identifying a replica host and a sync logic which is application specific to a data type associated with the client and the remote host; wherein the sync logic can be located anywhere on a network remote to the sync server and the remote host, in response to a sync request; and sync handler logic, coupled to the sync acceptor logic, for retrieving remote sync logic from the network, connecting to the remote and synchro-nizing the data between the client and the remote host using retrieved sync logic. The sync request can also include information for identifying a device specific transformation code for converting data between the client and the remote host during synchronization; wherein the sync handler logic includes means for retrieving the transformation code based on the information and converting the data between the client and the remote host based on the device specific transformation code. Here, the device specific transforma-tion code can be locally or remotely located anywhere on the network.

Another example of an adaptive sync server for trans-forming data between a client, and a remote host replica storing a replica of data on the client, having features of the present invention includes: sync acceptor logic for identi-fying the remote replica host and a device specific transfor-mation code for transforming the data on the remote host to that of a device type associated with the client, wherein the transformation code can be located anywhere on a network remote to the sync server and the remote host, in response to a request; and sync handler logic, coupled to the sync acceptor logic, for retrieving remote transformation code and transforming the data between the client and the remote host based on the device specific transformation code. The request can include a sync request for identifying a sync logic, which is application specific to a data type associated with the client and the remote host, in response to a sync request; and means for retrieving the sync logic, connecting to the remote host and synchronizing the data between the client and the remote host during the transformation.

According to another aspect of the present invention, a method is provided for the sync proxy to receive, accept, and process sync requests made from the handheld devices. In the present invention, a sync proxy—upon receiving a sync request from a handheld device—conducts synchronization and/or transformation for one or more handheld applications. For each handheld application, the proxy may receive the aforementioned name of the application, the replica host ID, sync logic ID, and transformation code ID either directly from the requesting handheld device or indirectly from a directory service specified by the requesting handheld device. To synchronize an application, the sync proxy may retrieve the sync logic associated with this application from the network address specified in the sync logic ID for this application sent by the requesting handheld device. The sync proxy then establishes a network connection with the replica host associated with this application based on its replica host ID received from the requesting handheld device.

According to yet another aspect of the present invention, to process synchronization for this application, the sync proxy executes the retrieved sync logic for this application. During the execution of the sync logic for this application, if data transformation is required, the sync proxy makes a connection to the network address of the transformation code associated with this application. The network address of the transformation code is part of the transformation code ID sent by the requesting handheld device. Then the sync proxy processes data transformation if necessary by executing this transformation code during the processing of the sync logic while synchronizing this application. While the present invention does not specify which programming language a sync logic is written with, the feature of the present invention where the sync proxy retrieves a sync logic from a remote host and executes this logic can be thought of in terms of existing Java enabled web processing where a Java program such as an applet can be downloaded by a web browser from a remote host and executed by the web browser locally for web processing.

In one embodiment of the present invention, the synchronization procedure for an application is divided into sync logic and transformation code. The sync logic is the application specific procedure of the synchronization tasks whereas the transformation code is the device dependent conversion process between two types of devices. The separation of these two means that the sync logic for an application can be provided and maintained by the maker of this application whereas the transformation code can be provided and maintained by the maker of the handheld device to which this transformation code applies. The sync proxies no longer have to store and maintain these synchronization or transformation procedures. All they need to do is retrieve the proper sync logic and/or transformation codes during synchronization. This approach greatly improves the management process of the application dependent and device dependent synchronization and/or transformation procedures by the sync proxies.

Such an approach also relieves the makers of the sync proxies from having to develop the synchronization procedures that are specific to the applications and the devices. As a result, the sync proxies can be more scaleable in terms of supporting more applications, devices, and management information systems, as long as the application and device dependent sync procedures are properly developed and maintained and made retrievable by their respective makers.

According to still another aspect of the present invention, a sync proxy may deploy a cache to temporarily store the sync logic or the transformation code for an application in anticipation that these executable data may be used by this sync proxy in the near future. An example of the cache feature of the present invention is described below. First, the sync proxy sets aside a block of memory (either main memory or disk space) as the cache. The sync proxy may adopt an indexing method to search and retrieve a cached sync logic or transformation code (e.g., based on their unique names). To retrieve a cached information (the sync logic or the transformation code for an application), the sync logic, before going out to the network to retrieve it, first searches its cache. If the information is not found in the cache, the sync proxy then goes to the network address associated with the ID of this information to retrieve it and updates the proxy's cache with it. If the information is found in the cache, the sync proxy retrieves this information from its cache instead of from the network. Then, the sync proxy executing this executable data (the sync logic or the transformation code for an application) by loading this data from the cache for execution.

According to yet another aspect of the present invention, a sync proxy can continuously monitor its computation load (e.g., in terms of the number of sync requests it is concurrently processing) against its computation capacity which is fixed based on its CPU power, the size of its RAM and storage memory, and its network bandwidth capacity. All synchronization proxies within the same network can participate in a real-time sharing with one another of their current computation load and their pre-configured computation capacity. Upon receiving a sync request, a sync proxy checks to see if the addition of this synchronization task to the current computation load exceeds the computation capacity of this proxy. If so, this proxy queries other proxies in the same network about their computation load and capacity information. This proxy, after getting the information, can then divert this incoming sync request to another proxy (in the same network) whose computation load is less. If all proxies on the same network have a full computation load, then the proxy that receives this sync request can return to the requesting handheld device a message indicating that the capacity for all sync proxies are full. It also terminates the connection with the requesting handheld device. Synchronization processes are not performed in this case. With this feature, the present invention also provides a load balancing function not available in the straightforward sync proxy approach.

BRIEF DESCRIPTION OF THE DRAWINGS

These, and further, objects, advantages, and features of the invention will be more apparent from the following detailed description of a preferred embodiment and the appended drawings wherein.

DETAILED DESCRIPTION

Figure 1:
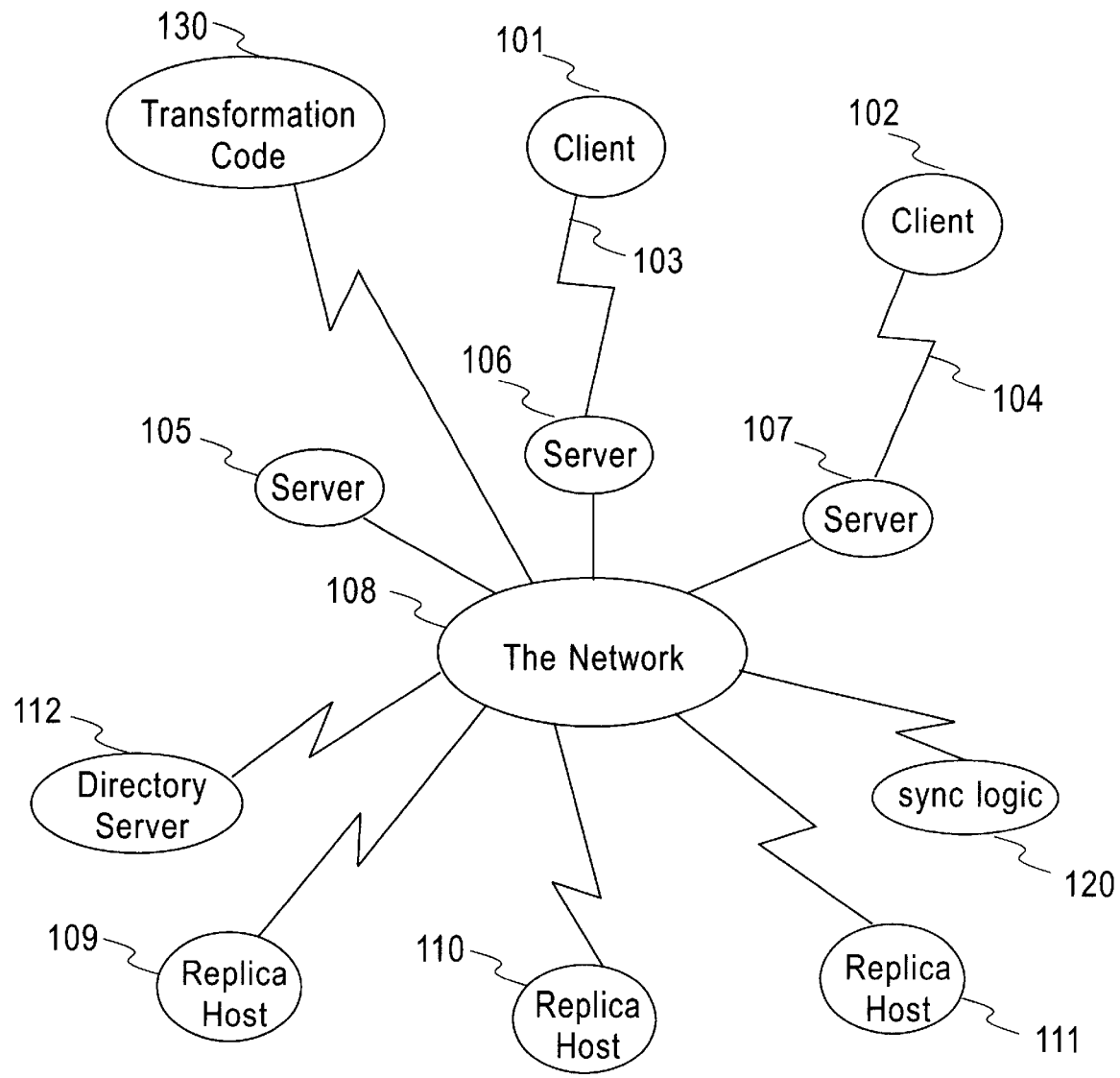
FIG. 1 depicts an example of an architecture of the sync proxy approach.

FIG. 1 depicts an example of an overall architecture of a network deploying the synchronization server approach having features of the present invention. A client (101, 102), examples of which include but are not limited to: handheld or palmtop devices (also called a hand-held terminal, palmtop computer, Internet appliance). A handheld device generally refers to any computer-based device small enough to be held in one hand while being operated by the other. Handheld devices may have smaller displays because the nature of the work for which they are designed does not require a great amount of information to be shown at one time. Handheld devices commonly contain communications equipment which allow them to communicate and/or synchronize with a central computer. Examples of handheld devices include but are not limited to 3Com's PALM PILOT™, Sharp's ZAURUS™, Psion PLC's PSION™ and various other "palm" type devices running Microsoft WINDOWS CE™, a smart phone, or an intelligent pager, etc. Thus, although the preferred embodiment refers to handheld devices, one skilled in the art will appreciate that the present invention can be beneficial for any client device which synchronizes data over a network.

The clients can be intermittently connected to servers (105–107) (also called synchronization proxy, sync proxy, sync server, or sync proxy server). Examples of the servers (105, 106, 107) include but are not limited to: a PC; a workstation (such as an IBM RS6000™); or a mainframe computer. A replica host (109, 110, 111) can be any computer running an information management system which maintains replicas of data from the handheld devices. A replica host can be a PC, a workstation, or a mainframe, etc. The sync proxies are connected with the replica hosts through the network (108). The handheld devices can be unconnected to the network some or most of the time, but have to remain connected (103, 104) while they are performing synchronization tasks. Those skilled in the art will appreciate that a handheld device can obtain a connection to a network (such as the Internet or a local area network) by dialing up to a network remote access server through a modem, or by having a direct serial-port connection (e.g., using the PALM PILOT™ cradle) to a computer (such as a desktop PC) that is connected to the network. As is conventional, a directory server (112) provides services including the pre-configuration and storage of information for users and provides a search engine to dynamically retrieve the information through a network such as the Internet upon request. Examples of these services include Novell's Novell Directory Services (NDS) and Microsoft's Active Directory both of which provide directory information which can be accessed through LDAP (Lightweight Directory Access Protocol—an Internet protocol for accessing directory information).

According to the present invention, sync logic (120) and/or transformation code (130) are stored remotely. An example of an adaptive sync server for synchronizing data between a client (101–102) and a remote host replica (109–111), which stores a replica of data on the client, includes: sync proxy logic (FIG. 3) for identifying the replica host (109–111) and the sync logic (120), which is application specific to a data type associated with the client and the remote host. The sync logic (120) can be located anywhere on a network remote to the sync server (105–107) and the remote host (109–111), in response to a sync request. The sync proxy logic is adapted for retrieving the remote sync logic from the network (108); connecting to the remote host based on the request; and synchronizing the data between the client and the remote host using retrieved sync logic. The sync request can also include information for identifying a device specific transformation code (130) for converting data between the client and the remote host during synchronization, including means for retrieving the transformation code based on the information and converting the data between the client and the remote host based on the device specific transformation code. Here, the device specific transformation code can be locally or remotely located anywhere on the network.

Alternatively, the server is adapted for transforming data between the client (101—102), and a remote host replica (109–111) storing a replica of data on the client. Here, the request is used to identify the applicable remote replica host and a transformation code (130) for transforming the data on the remote host to that of a device type associated with the client. The transformation code can be located anywhere on a network remote to the sync server and the remote host. The server retrieves the remote transformation code (130) based on the request and transforms the data between the client and the remote host based on the device specific transformation code.

The request can include a sync request with information for identifying the sync logic (120), which is application specific to a data type associated with the client and the remote host, in response to the sync request. The server retrieves the sync logic; connects to the remote host based on the information; and synchronizes the data between the client and the remote host during the transformation.

Figure 2:
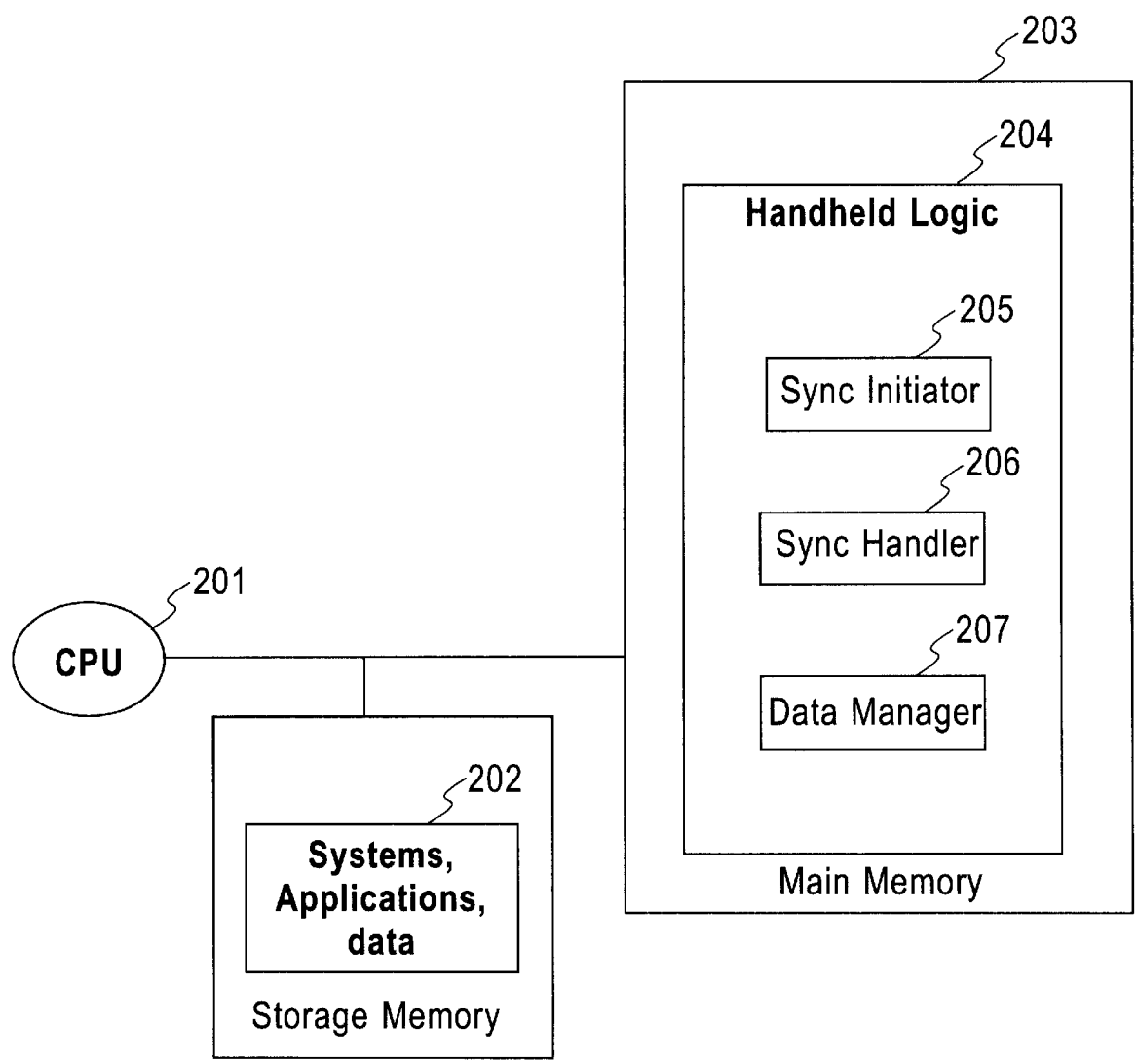
FIG. 2 depicts an example of an architecture of a client implemented as a handheld device having features of the present invention.

FIG. 2 depicts an example of an overall architecture of a client implemented as a handheld device capable of performing synchronization in accordance with the present invention. As depicted, the handheld device includes a CPU (201), a main memory (203) such as volatile RAM, and storage memory using (202) for example nonvolatile RAM, ROM, or disk for storing systems (such as the operating system), applications (such as the e-mail and calendar software), and the data (such as the content of an address book or memo pad). Most handheld devices store all information in RAM and ROM without any disks. The main memory (203) stores the handheld device logic (204) of the present invention that is preferably embodied as computer executable code which may be loaded from the storage memory (202) into the main memory (203). Here, the handheld logic (204) of the present invention (204) includes a sync initiator (205) (with details depicted in FIG. 5), a sync handler (206) (with details depicted in FIG. 7), and a data manager (207) (with details depicted in FIG. 11). The handheld logic (204) of the present invention is initially stored in the storage memory (202). When the synchronization task is started, the CPU (201) loads the sync logic (either in full or in part in an on-demand fashion) into the main memory (202) and starts executing this logic for synchronization.

Figure 3:
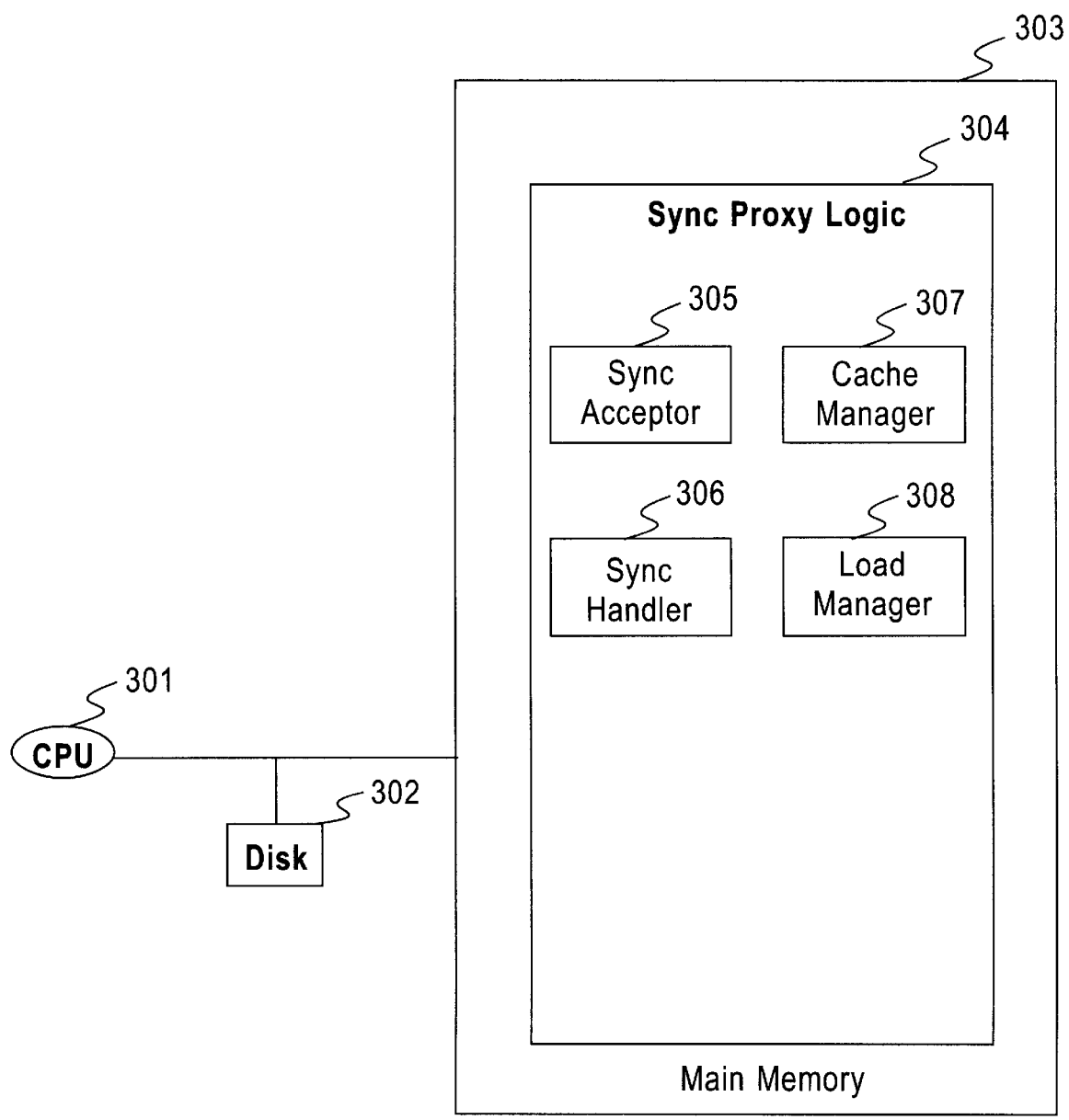
FIG. 3 depicts an example of an architecture of a sync proxy of the present invention.

FIG. 3 depicts an example of an architecture of a computing device configured as a synchronization proxy of the present invention. Examples include but are not limited to: a PC; a workstation; a server; or a mainframe. The sync proxy can include a CPU (301), storage devices (302) such as disks, and a main memory (303) such as RAM. Here, the main memory (303) stores the sync proxy logic (304), which is preferably embodied as computer executable code which may be loaded from the disks (302) into the main memory (303). In this example, the sync proxy logic (304) includes a sync acceptor (305) logic (with details depicted in FIG. 6), a sync handler (306) logic (with details depicted in FIG. 8), a cache manager (307) (with details depicted in FIG. 9), and a load manager (308) (with details depicted in FIG. 13).

Figure 4:
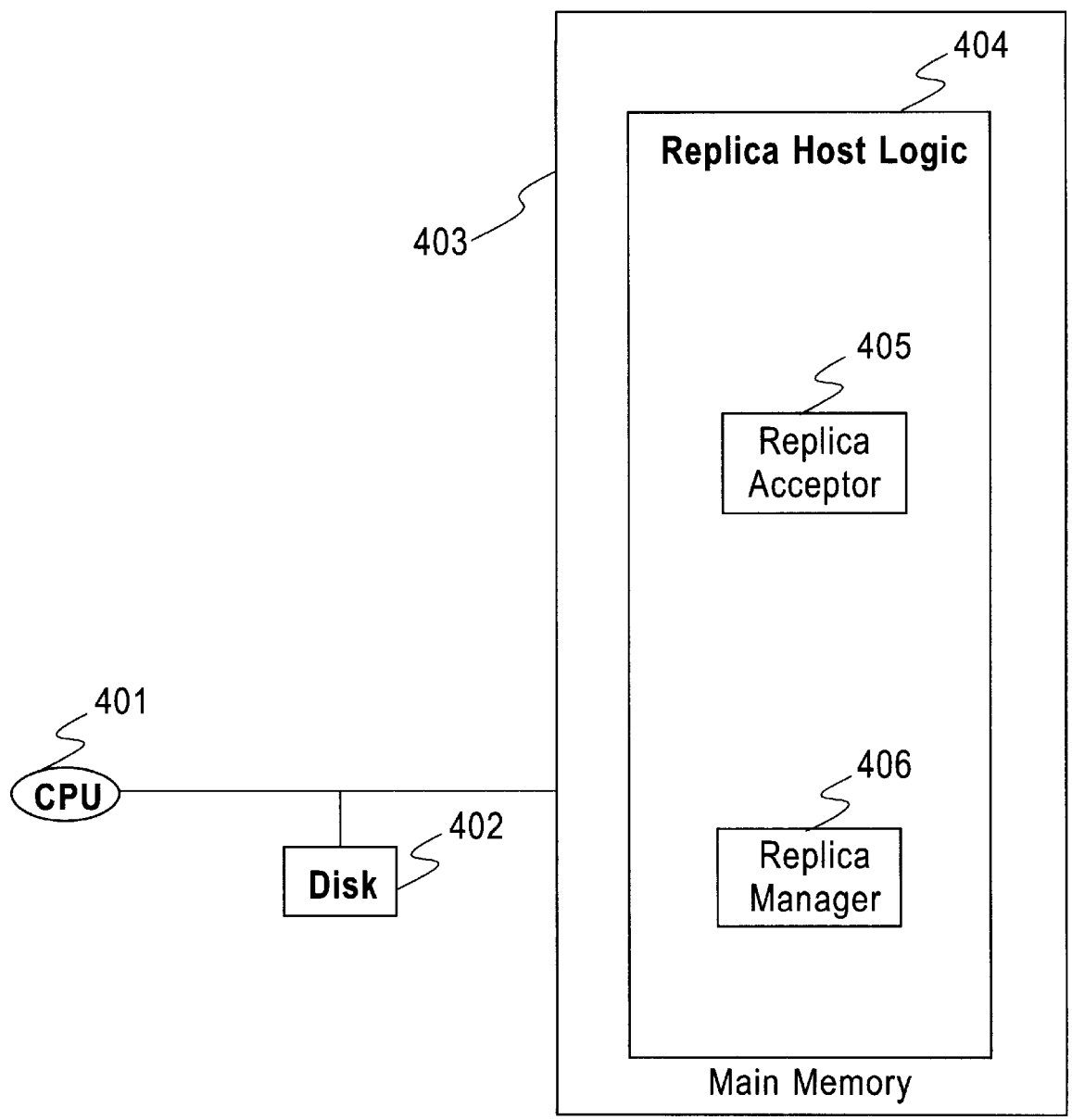
FIG. 4 depicts an example of an architecture of a replica host feature of the present invention.

FIG. 4 depicts an example of an architecture of a computing device configured as a replica host of the present invention. Examples of a replica host include but are not limited to: a PC; a workstation; a server; or a mainframe. As depicted, the replica host can include a CPU (401). storage devices (402) such as disks, and main memory (403) such as RAM. The main memory (403) stores the replica host logic (404), which is preferably embodied as computer executable code which may be loaded from disks (402) into main memory (403). The replica host logic (404) includes a replica acceptor (405) (with details depicted in FIG. 12) and a replica manager (406) (with details depicted in FIG. 11).

As is conventional, the handheld device needs to first establish a network connection before the synchronization tasks can be performed. There are many available technologies in connecting a handheld device to the network such as the Internet or a local area network. For example, a PALM PILOT™ has a TCP/IP software that comes with the device. When a PALM PILOT™ is attached to a modem, it can run this TCP/IP software to dial up to an ISP (Internet Service Provider) through a phone line to get a connection to the Internet. Alternatively, the device can be connected through a serial port to a desktop PC that is connected to the network. There are programs available (such as Microsoft's Remote Access Service, or RAS) to enable a PC as a network access server and provide a connection to the network to any device that connects to this PC's serial port. While not part of the present invention, the network connection process of the client device is a prerequisite of the synchronization methods embodied in the present invention.

Figure 5:
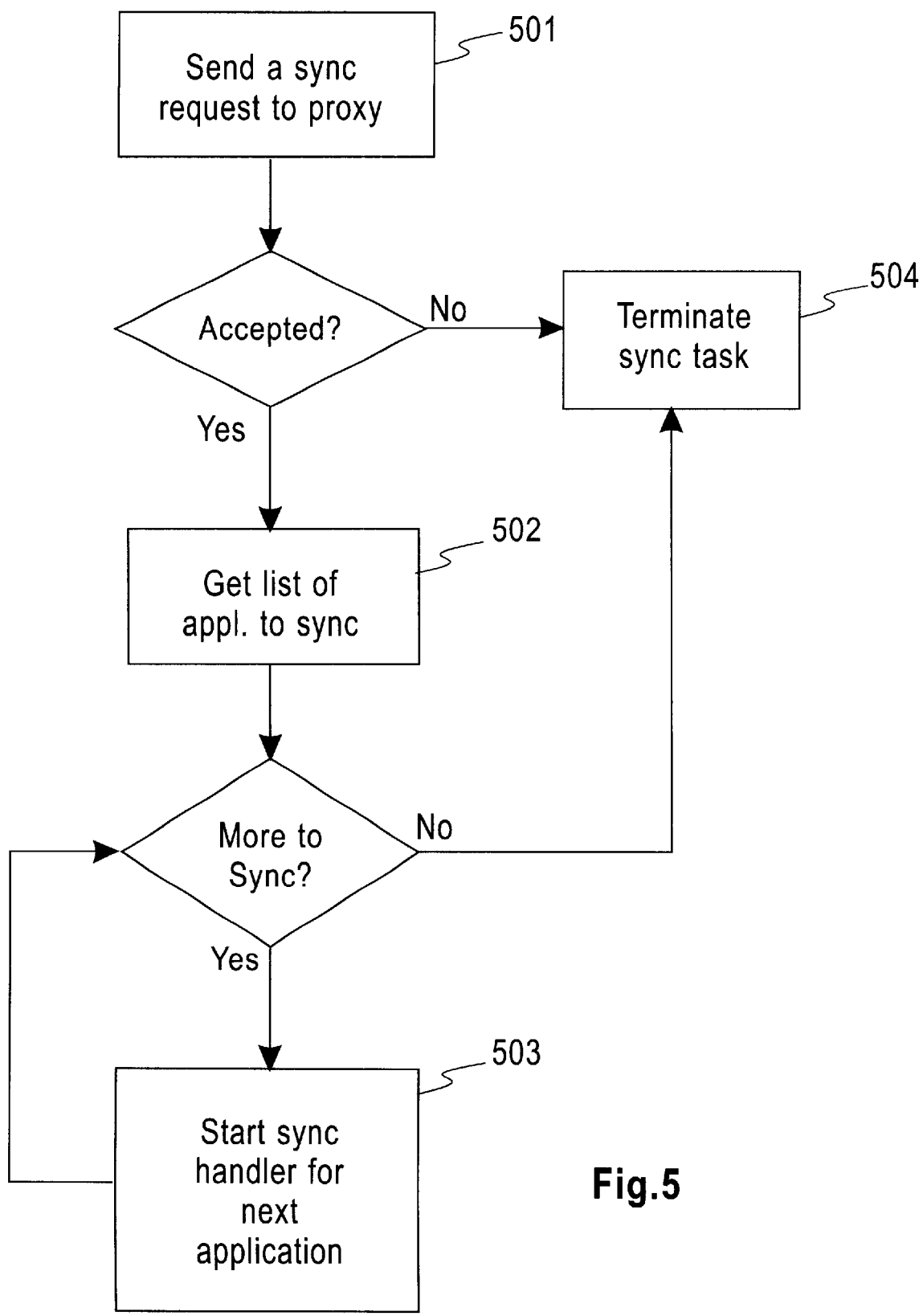
FIG. 5 depicts an example of a handheld sync acceptor feature of the present invention.

After the device establishes the connection to the network, this device can now perform the synchronization tasks by starting the sync initiator process depicted by the sync initiator (205) in FIG. 2, and, in more detail in FIG. 5. To start the synchronization process, the sync initiator first sends a sync request to a sync proxy (501). Those skilled in the art will appreciate that the network addresses of the sync proxies can be known beforehand by the handheld devices, and one sync proxy address can also be pre-configured as the default by the handheld devices. The information that the handheld device sends to the proxy to request synchronization can include a mutually understood code to indicate that it is a sync request, as well as some identification information about the user (such as the user ID and the encrypted password or shared secret for authentication and authorization) and the device and system type of the handheld. While the method for authentication and authorization is not a part of the present invention, those skilled in the art will appreciate that existing authentication and authorization technologies over the network can be incorporated into the collaborative procedure between the sync initiator of the handheld (501 in FIG. 5) and the sync acceptor of the sync proxy (305 in FIG. 3).

If the sync request is rejected, the sync initiator process terminates the sync task (504). Otherwise, the sync initiator determines the list of applications needed to be synchronized (502). The applications to be synchronized may include for example an address book application, a memo pad application, a calendar application, an e-mail application, or any other applications in the handheld device. Those skilled in the art can understand that determining a list of applications to be synchronized may involve a screen input from the user (such as checking the applications to be synchronized from a user interface), a retrieval of a default set of applications, or a software to dynamically selecting the applications to synchronize. Once the list of applications to be synchronized is determined, the sync initiator process starts a sync handler process (503) (with details depicted in FIG. 7) for each application on the list. The first task of the sync proxy is to start the sync acceptor (305 in FIG. 3 and described in more detail with reference to FIG. 6).

Figure 6:
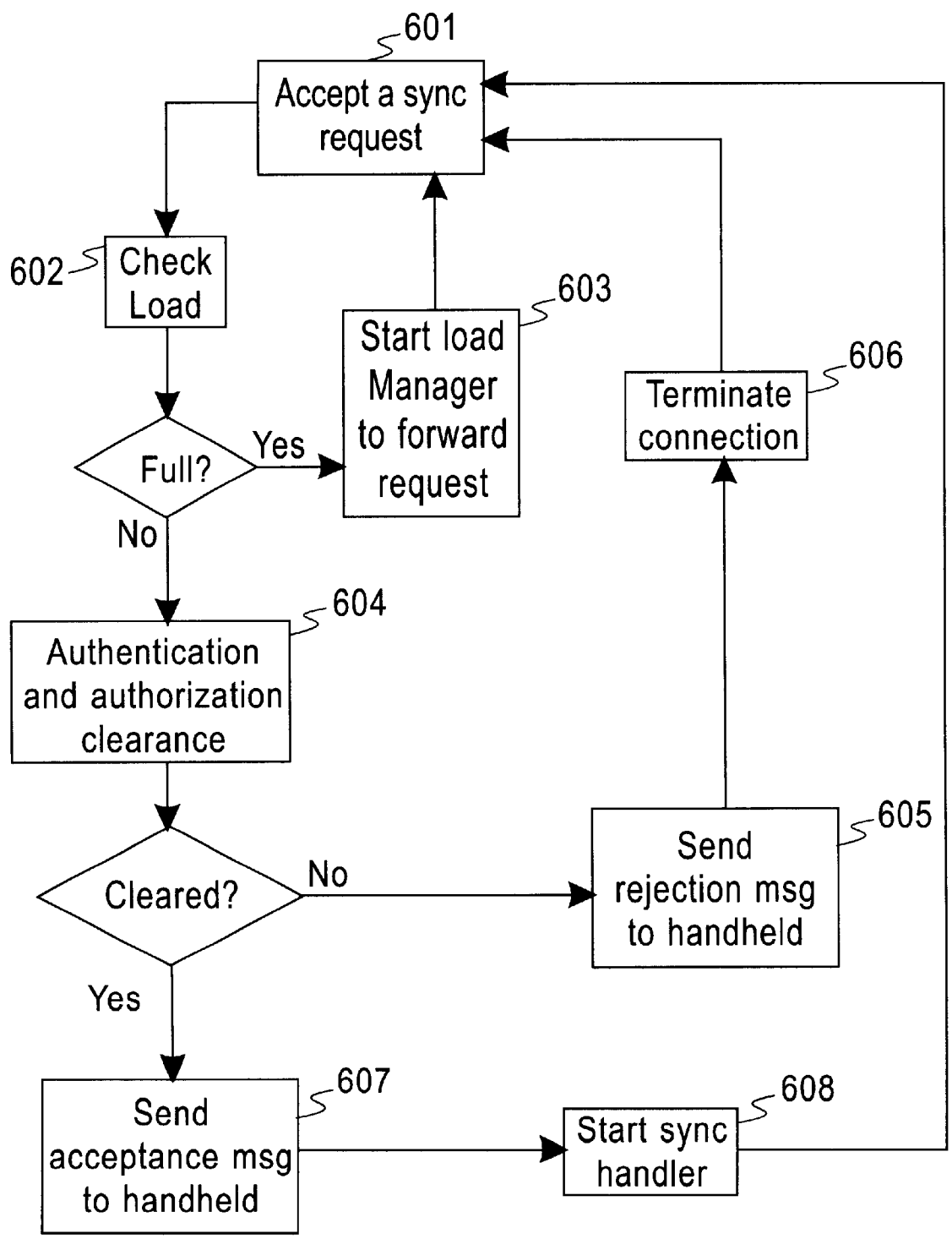
FIG. 6 depicts an example of a proxy sync acceptor feature of the present invention.

FIG. 6 depicts an example of a proxy sync acceptor feature of the present invention. As depicted. The sync acceptor can be an infinite loop in which the sync proxy continuously receives sync requests from the handheld devices (601). Upon receiving a sync request, the sync acceptor may first check if its own computation load has reached its capacity (602). If so, the sync acceptor starts the load manager (603) to forward this request to another sync proxy on the same network (details depicted in FIG. 13). If the sync proxy is not overloaded, the sync acceptor can perform a conventional authentication and authorization procedure based on the identification information inside the request messages received from the requesting handheld devices. If the authentication and authorization procedure fails (e.g., the handheld user failed to authenticate or is not authorized for synchronization by this sync proxy), the proxy sends a rejection message back to the handheld (605), terminates the connection (606) and goes back to wait for the next sync request (601). if the authentication and authorization procedure succeeds, the proxy then sends an acceptance message back to the requesting handheld device (607). Next, the proxy starts the proxy sync handler to synchronize for this synchronization task (608).

Those skilled in the art will appreciate that the sync acceptor process is preferably implemented with a multi-thread approach using current software technology. This means that upon receiving a request from a handheld (601), the sync acceptor starts a new thread to process the remaining steps (602–608) for this request. The three arrow-headed lines, from 603 to 601, from 606 to 601, and from 608 to 601, simply indicate a termination of this thread. Those skilled in the art will also appreciate that in an operating system that does not support multithreading, the creation of a new thread (601) can be thought of as creating of a new process. The termination of a thread therefore is equivalent to the termination of a process.

Figure 7:
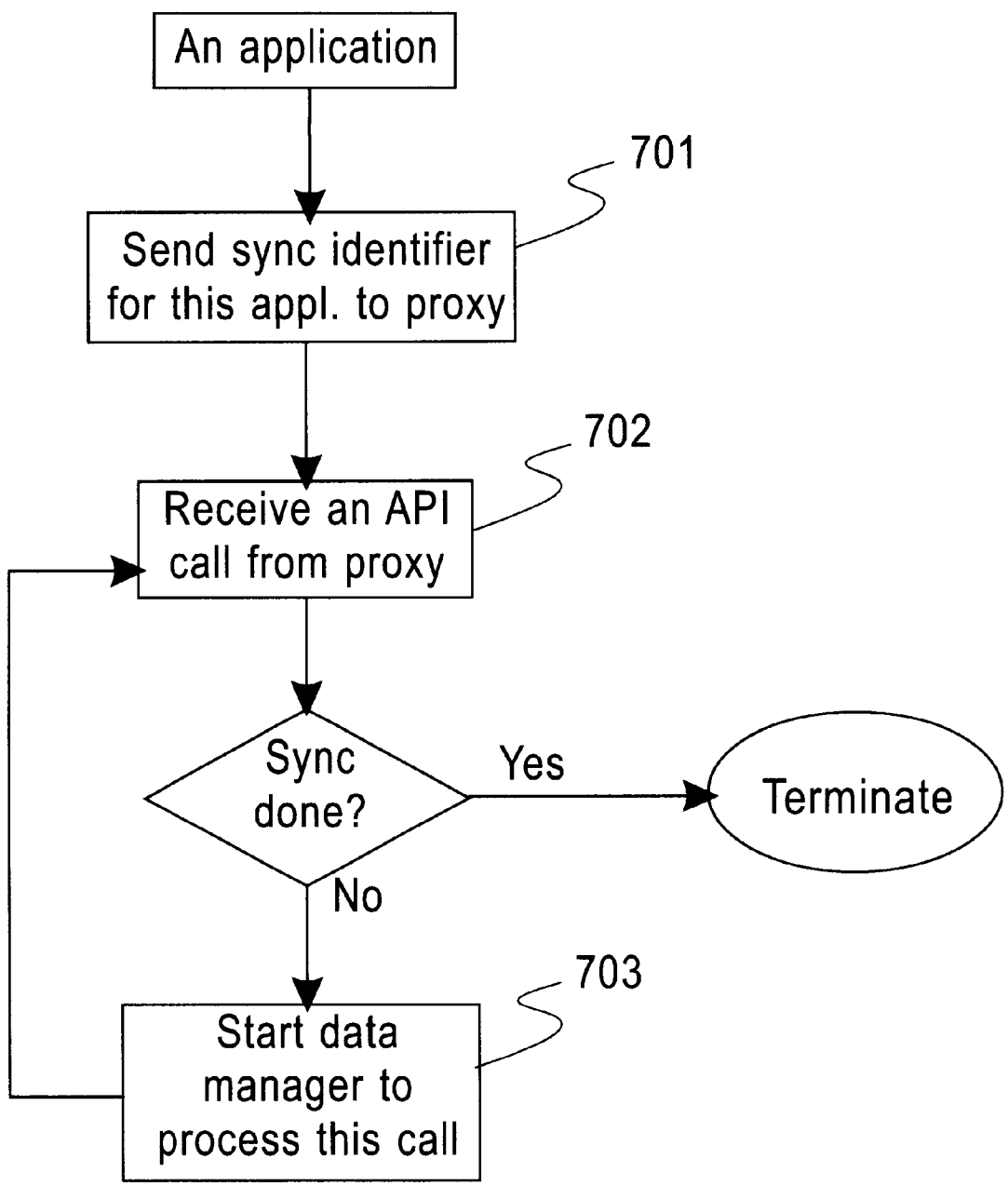
FIG. 7 depicts an example of a handheld sync handler feature of the present invention.

Returning now to the handheld devices, with reference also to FIG. 5, the sync handler for each of the application to be synchronized is started in sequence (503) after the acceptance message is received from the proxy (605). FIG. 7 depicts a more detailed example of the sync handler logic (for an application).

As depicted in FIG. 7, the sync handler for a specific application first retrieves information associated with this application (701). They preferably include the ID of the replica host, the ID of the sync logic, and the ID of the transformation code for this application (701).

A replica host for an application is the computer device that stores the replica of this application. The device can be a PC, a workstation, server or a mainframe, and must be network connected. The ID of the replica host can include the network address of the replica host and the location of the replica of this application inside the replica host. Those skilled in the art will appreciate that, based on current Internet technology, a URL (Universal Resource Locator) is a reasonable way of implementing the replica host ID.

The sync logic for an application, preferably embodied as executable code, can be used to resolve conflicts, to specify overriding direction, or to take certain actions to fulfill the specific needs for this application. For example, the sync logic for an expense keeping application may specify that the handheld always overrides the replica host (such as a corporate database server) for certain records (such as hotel expenses) as the corporate records represent suggested prices whereas the handheld records specify the actual billings. The ID of the sync logic can include a unique name of the sync logic, the network address and the location inside this address where this sync logic is stored. Those skilled in the art will also appreciate that, using existing current Internet technology, a URL is again a reasonable way to implement the sync logic ID.

The transformation code for a specific device and application combination, preferably embodied as executable code, can be used to filter, transform, and change data so that certain information can be feasibly used and processed in computing devices having different CPU powers, memory capacities, and physical constructs. For example, a web page with images being sent from a PC replica host to a client may run a transformation code to have all images either removed (filter function) or reduced to a very coarse resolution (transform function) so that this page can be shown on the client's screen without taking up too much memory. The ID of the transform code for an application can include a unique name of the transformation code, the network address and the location inside this address where the transformation code is stored. Those skilled in the art will again appreciate that, using existing Internet technology, a URL is yet again a reasonable way to implement the transform code ID.

According to another feature of the present invention, the aforementioned three IDs for each application is preconfigured and stored in the handheld devices or in a directory service for the user of this handheld device. If these IDs for the application are stored in the handheld device, the sync handler sends the sync identifier, which preferably includes the name of the application to be synchronized together with the three IDs to the sync proxy (701) and then goes into a loop (702). If these IDs are stored by way of a directory service, the sync handler sends the sync identifier which includes the identification of the user, the device, the application, and the address of the directory server (with which the sync proxy will use to access the directory service) to the sync proxy (701).

There skilled in the art will appreciate that the need to send any of the three IDs can be eliminated by the use of default settings. For example, if a handheld device configures with a sync proxy a default application to be synchronized, then this sync proxy need not retrieve the name of the application to be synchronized during the sync processing for this handheld device. The lack of an application name in this case indicates the default application is to be synchronized.

Similarly, the user of a handheld device can also configure with a sync proxy a default replica host or device. In these cases, the sync proxy needs not retrieve this information either from the handheld device or from the directory. Instead, it can uses its pre-configured default setting for this handheld device to get this information.

While the ID of information such as the replica host, the sync logic, or the transformation code is described previously as including a network address and the exactly name and location with their respective address, an alternative implementation for an ID does not require the specification of its corresponding network address. Here, it is the sync proxy's responsibility to find out the exact network address of a particular ID based on the name included in this ID. An example is that a handheld device makes a sync request for an application where the ID for the transformation code does not include the network address of the proper transformation code for this device. The sync proxy, upon receiving the ID of the transformation code, determines the proper network location where the proper transformation code resides based on the type of the device that makes the sync request.

Referring again to FIG. 7, within the loop (702), the sync handler first waits for an API (Application Program Interface) call from the sync proxy (702). If the call from the proxy indicates that the synchronization process for this application is completed, the sync handler terminates and goes back to the sync initiator to process the next application to be synchronized. If the API call is a data management function (such as opening a database, reading a record, etc.), the sync handler starts the data manager to process this API (703) (with more detailed discussions in FIG. 11).

The sync acceptor (FIG. 6) in the synchronization proxy—after authentication and authorization procedure is completed and the sync request is accepted—may send an acceptance message to the requesting handheld (605 in FIG. 6) and then start the proxy sync handler (606 in FIG. 6) to process the synchronization.

Figure 8:
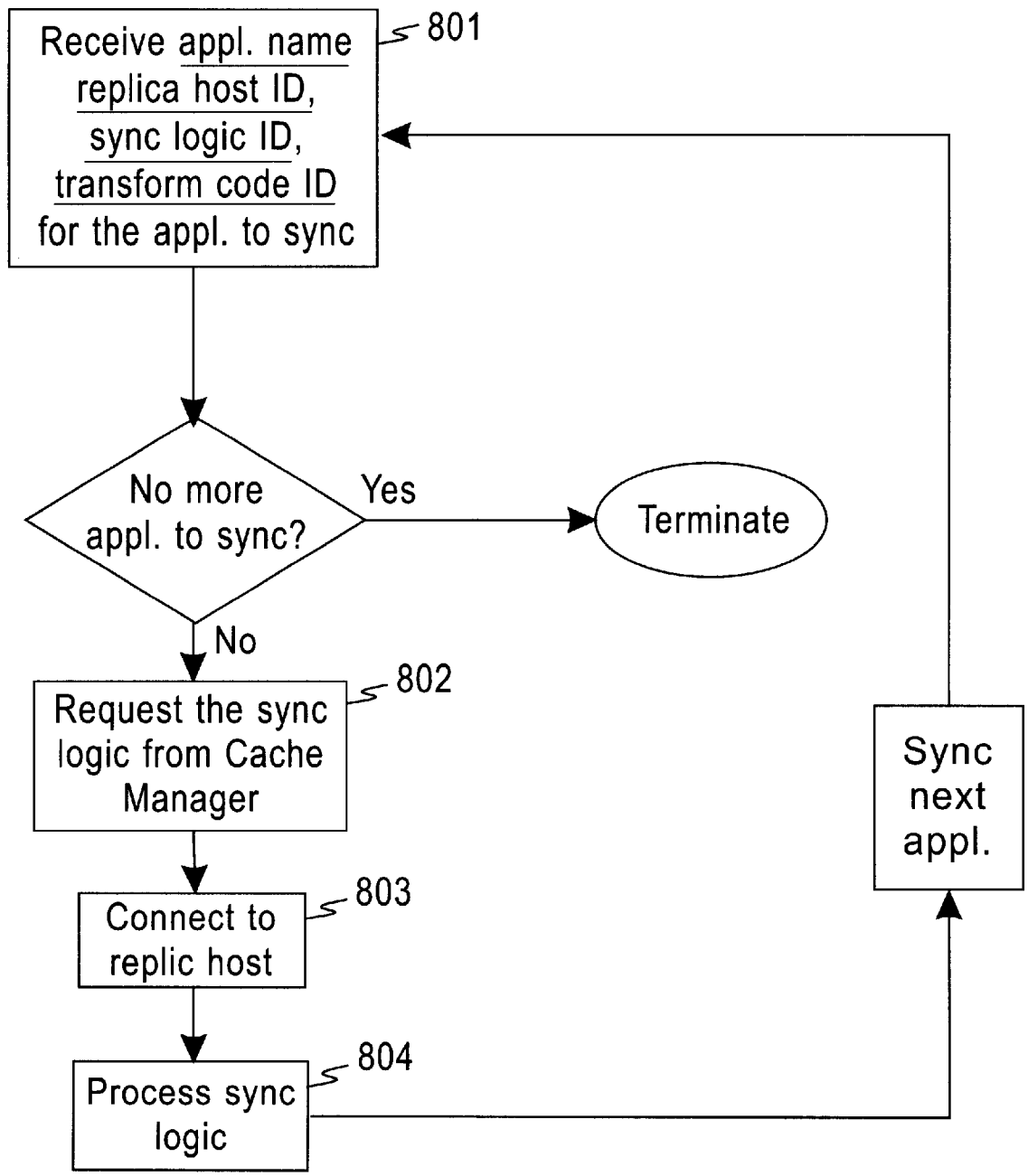
FIG. 8 depicts an example of a proxy sync handler feature of the present invention.

FIG. 8 depicts an example of a detailed illustration of a proxy sync handler. As depicted, the proxy sync handler may first receive from the requesting handheld device the name of the application to be synchronized and the three IDs respectively for the replica host, the sync logic, and the transformation code (801). The information can be received directly from the handheld device that makes the sync request, or through a directory server as described earlier. If there is no more applications to sync, the handheld may send a termination message to indicate so. If such a termination message is received instead of the aforementioned three IDs, the sync handler terminates the synchronization process. Otherwise, the sync handler may request the cache manager to retrieve the sync logic based on the sync logic ID (802). An example of the cache management is discussed in FIG. 9. After the sync logic is retrieved, the sync handler may then establish a connection to the replica of this application based on the replica host ID (803). Once the connection is established, the sync handler can start executing the sync logic to perform the synchronization task for this application (804). A more detailed example of the execution of the sync logic will be discussed with reference to FIG. 10.

Figure 9:
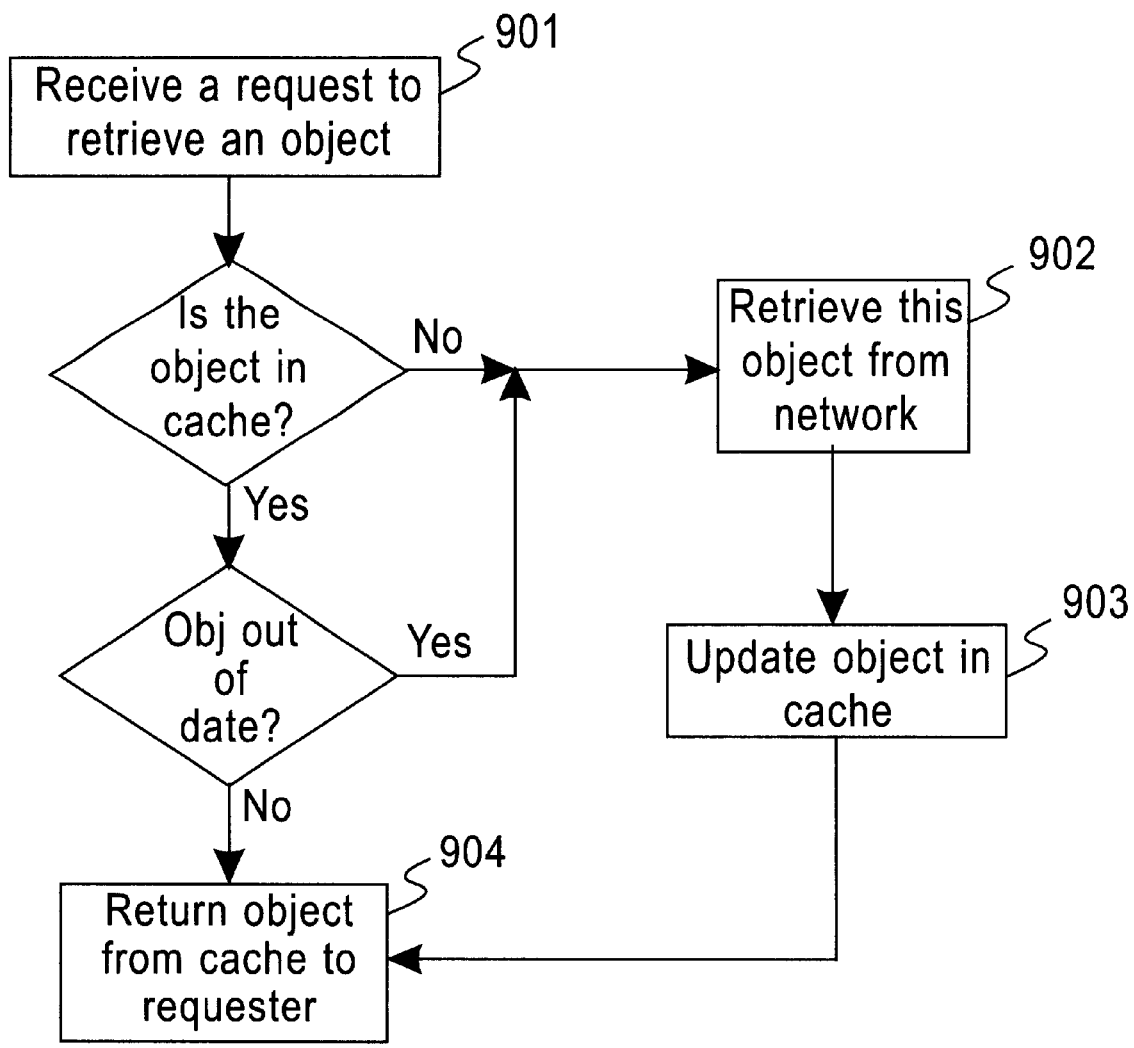
FIG. 9 depicts an example of a proxy cache manager feature of the present invention.

FIG. 9 depicts an example of the cache manager deployed by the synchronization proxy to manage the caching and retrieval of objects such as the sync logic and transformation codes for handheld applications. Upon receiving a request for an object (901), the cache manager checks to see if this object is in the cache. The cache can be either in main memory (303) or in disks (302).

If the requested object is not in the cache, the cache manager retrieves this object from the network based on the ID of this object (902). Once the object is retrieved from the network, it is inserted into the cache (903) and returned to the requester (904). If the object is found in the cache, the cache manager checks to see if the object in the cache is still current. If it is not, the cache manager retrieves it from the network using its ID (902). After the up-to-date object is retrieved from the network, it replaces the older one in the cache (903) and is returned to the requester (904). If the object is up to date, it is returned to the requester (904).

While cache object currency validation is not a feature of the present invention, those skilled in the art will appreciate that many such existing techniques can be adopted by the cache manger feature of the present invention. For example, a cache manager may adopt a policy such that no object is considered up to date if it is in the cache for over a fixed period of time. Another example is that a cache manager may register with the original object provider so that every time when an original object is updated (or created or deleted), the provider may send a message to the cache manager about the change of this object. The cache manager, upon receiving such a message, may then either remove this object from the cache, mark it as invalid, or retrieve the up-to-date one and replace the old one in the cache.

Figure 10:
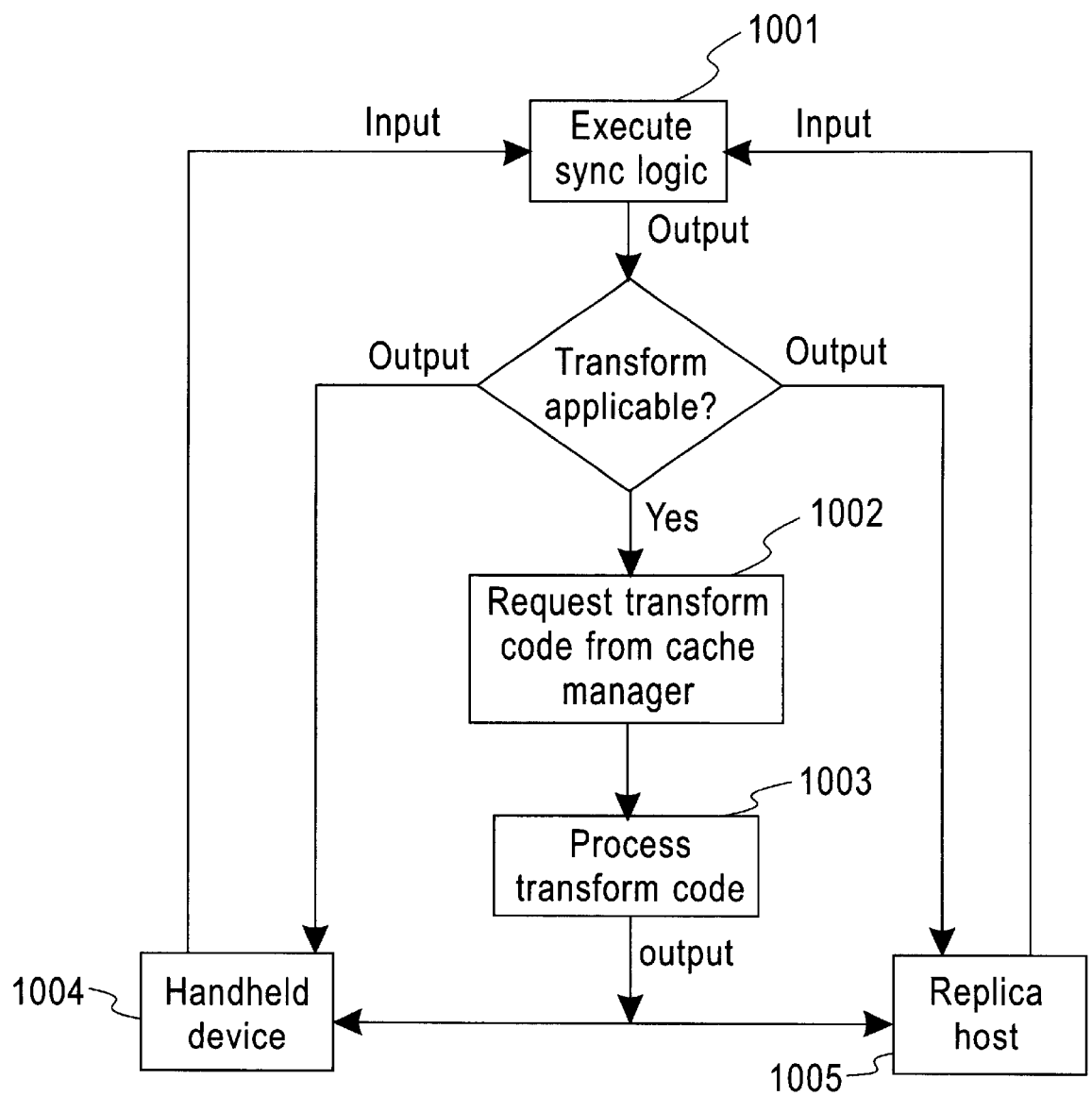
FIG. 10 depicts an example of a proxy sync handler processing data transformation.

An example of the execution of the sync logic (804) by the proxy sync handler feature (FIG. 8) of the present invention is illustrated in more detail in FIG. 10. As depicted, the sync logic involves reading data from and writing data to both the handheld device (1003) making the sync request, and the replica host (1004) hosting the replica of the application of this sync logic for the requesting handheld. There may be many differences between the data management systems in one handheld device and the information management system deployed in the replica host of this handheld device (e.g., PALM PILOT™ e-mail vs. Lotus NOTES™ e-mail). For example, the data formats may be different. The storage capacities between the handheld device and the replica host may be different (e.g., PALM PILOT™ vs. workstation). The display devices between them may also be different (e.g., black-and-white low-resolution PALM PILOT™ screen vs. a high-resolution PC monitor). The need to properly transform information from one end (e.g., a workstation replica host) to the other (e.g., a PALM PILOT™) is addressed in the present invention by the execution of the transformation code.

During the execution of the sync logic for an application (FIG. 10), the sync logic determines the update direction for each data item of this application in the handheld and in the replica host. For example, for two data items of the same unique ID from the handheld and the replica host respectively, the sync logic may determine that the handheld data item overrides the replica host one, or vice versa. The sync logic may also determine that these two data items are the same and no data movement is necessary. It is also possible that the sync logic may find that these two items conflict (e.g., both have been updated independently) and decide to duplicate each item while retaining its own version.

In the proxy sync handler feature of the present invention, before a data item is to be written from one device to another (e.g., from the replica host to the handheld device, or vice versa), the proxy sync handler checks to see if a data transformation is applicable. If it is, the proxy sync handler can request the transformation code (specified by the ID sent from the handheld device making the sync request) from the cache manager (1002). The cache manager may process the procedures illustrated in FIG. 9 to make available the requested object. Once the transformation code for the application being synchronized is available, the proxy sync handler executes the code for the data item to be written to the device (1003).

Figure 11:
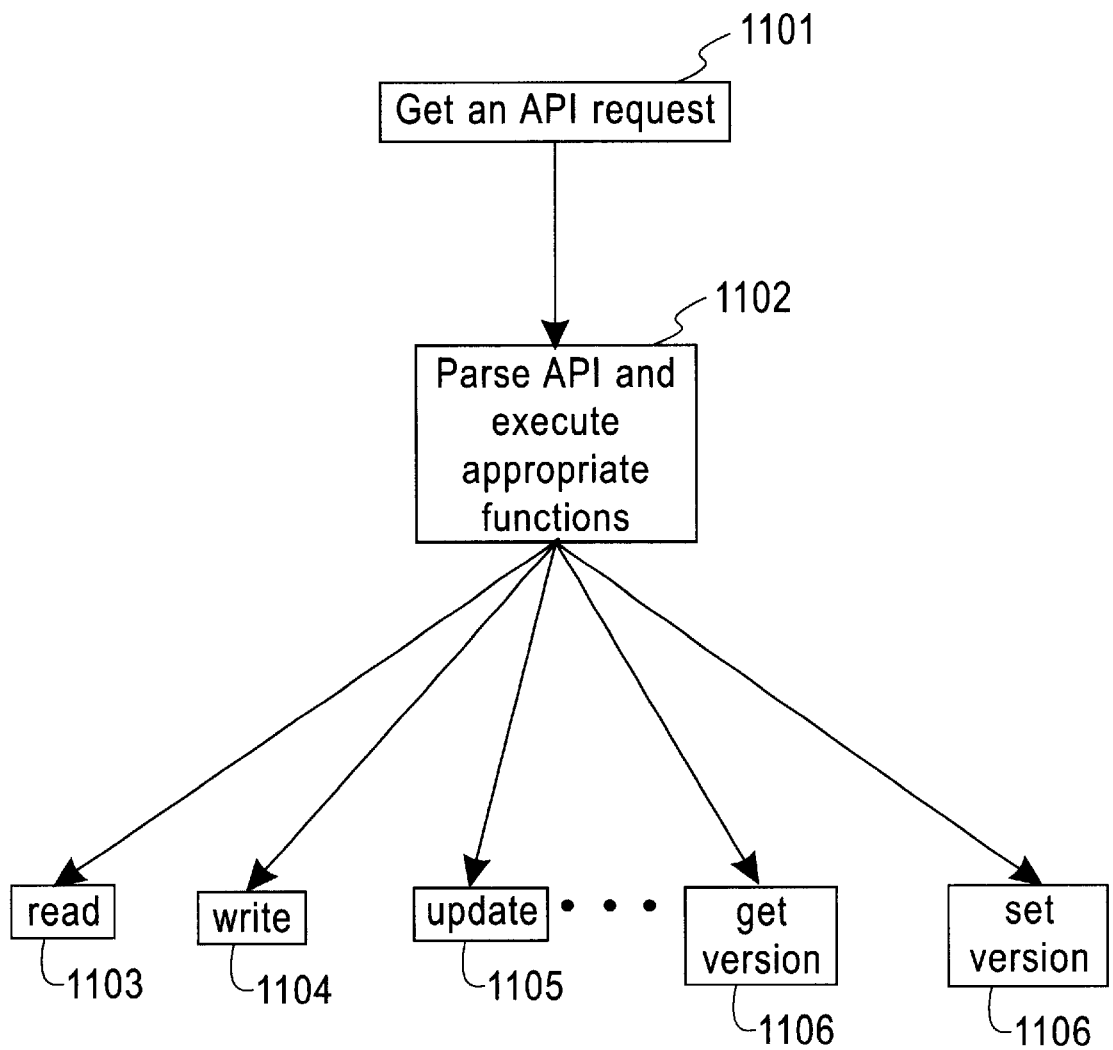
FIG. 11 depicts an example of logic for a data manager or a replica manager.

FIG. 11 depicts an example of logic for a data manager (207) or a replica manager (406). The proxy sync handler (306 and FIG. 8) can use conventional techniques to read data from (1103) and write data to (1104) both the handheld devices and their replica hosts through APIs. It is up to the data manager (207) and the replica manager (406) to interpret the API calls received from the sync proxy and to perform the appropriate data or replica management functions. Those skilled in the art will appreciate that these API calls can be typical data management functions such as read a data item (1103), write a data item (1104), update a data item (1105), delete a data item, etc. In order to process synchronization more efficiently, the sync logic for an application can be written to take advantage of any version and update history information available from the handhelds and their replica hosts in order to expedite the synchronization process. Those skilled in the art will appreciate that the aforementioned APIs can include functions that retrieve (1106) and/or set (1106) version and update history information from the handhelds and the replica hosts.

Figure 12:
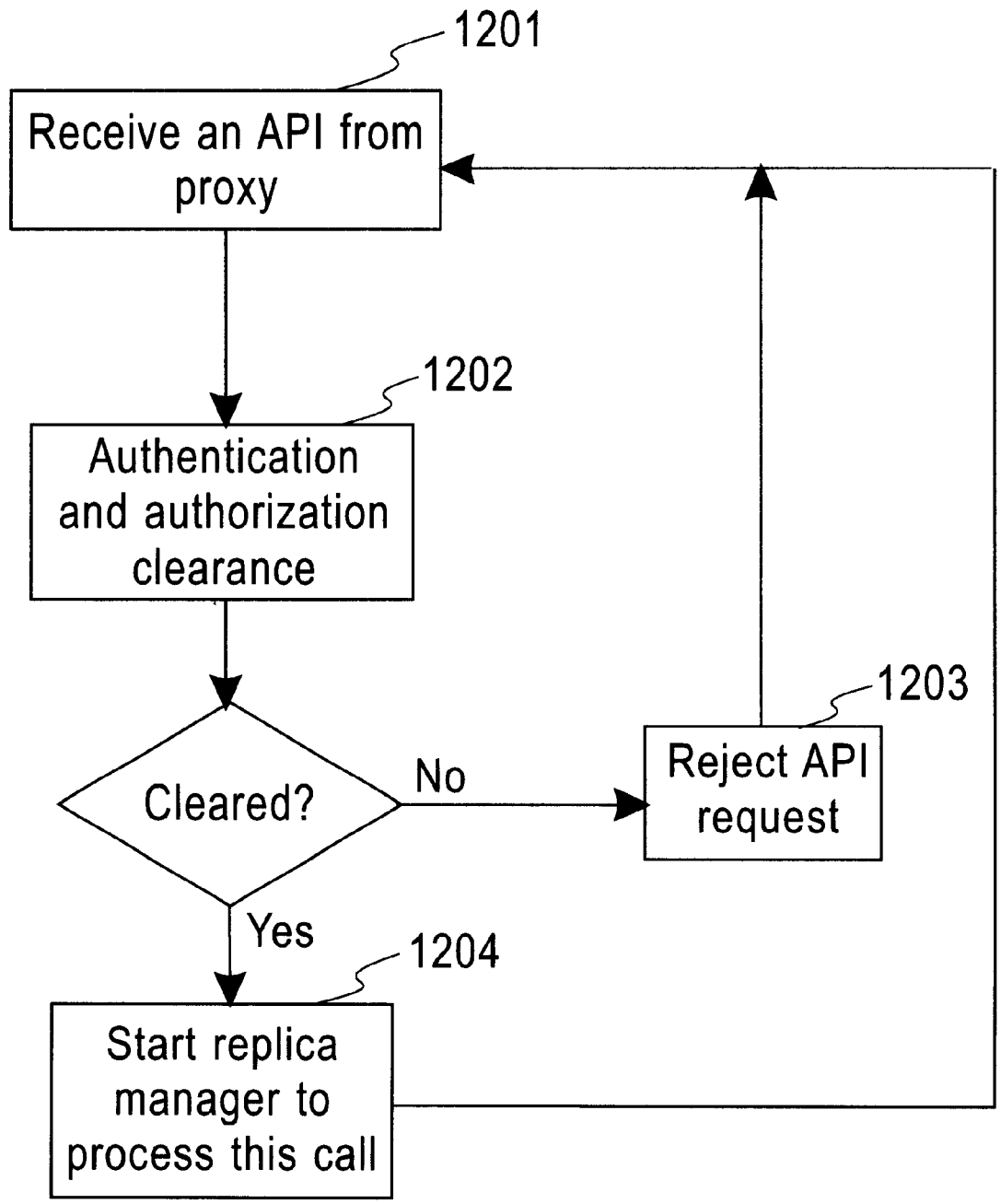
FIG. 12 depicts an example of a replica manager in host replica or a data manager in a handheld device.

FIG. 12 depicts an example of the replica acceptor feature of the present invention (405). The replica acceptor can be a looping process in which it first waits for an API call (1201). When an API call arrives from the sync proxy, the replica acceptor may start an authentication and authorization process to verify the identity of the requesting sync proxy (1202). If the authentication and authorization process fails, the replica acceptor rejects the API call (1203). Otherwise, the replica acceptor starts the replica manager (1202) to process the appropriate replica management function.

Figure 13:
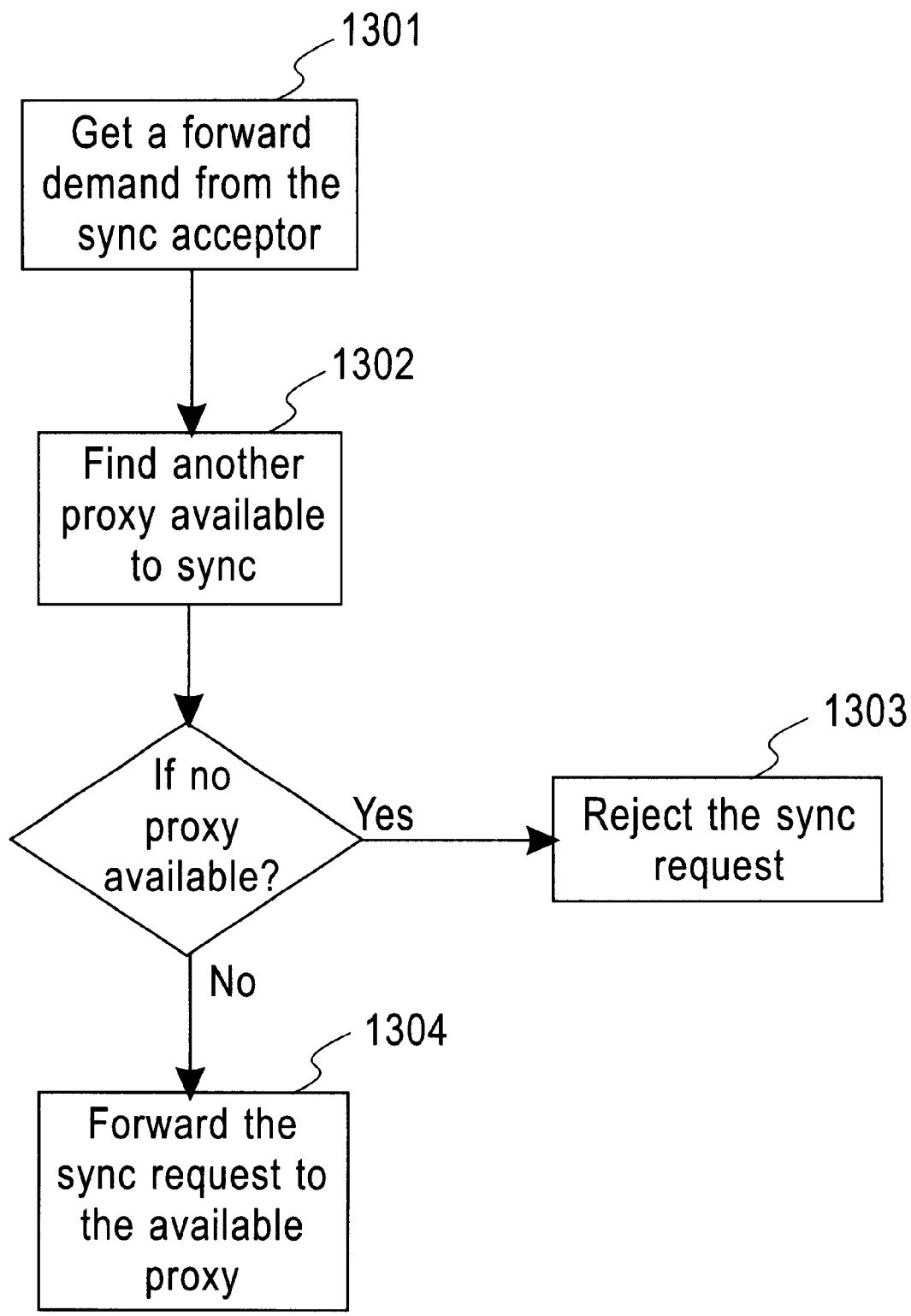
FIG. 13 depicts an example of a proxy load manager feature of the present invention.

FIG. 13 depicts an example of the load manager feature in a sync proxy of the present invention (308). When the proxy sync acceptor (FIG. 6) receives a sync request and detects that the this sync proxy is overloaded, it can start the load manager to forward this sync request to another sync proxy (603). The load manager, upon receiving a demand to forward a sync request (1301), determines if there is another proxy on the same network that is not overloaded (1302). If one is found, the load manager forwards the sync request to this sync proxy (1304). If every proxy on the same network has a full load, the load manager rejects this sync request (1303). Those skilled in the art may appreciate that the load managers from all the sync proxies may participate in a protocol to exchange load information from one another. Based on this load information from other proxies on the same network, a load manager may also adopt a policy in choosing the proxy to forward (e.g., the load manager may choose the proxy that has the current lowest computation load) for overall load balancing over the network.

The proxy sync handler may decide to forward a sync request based not just on its load condition as illustrated in (602). It is possible that in a network deploying multiple sync proxies, each sync proxy specializes in data synchronization for a specific handheld device or information management system. For example, in a network supporting data synchronization for handheld devices that include a PALM PILOT™ and a WINDOWS CE™ based device, two sync proxies are deployed with proxy 1 specializing in data synchronization for PALM PILOT™ and proxy 2 for data synchronization for Windows CE. Thus, based on this configuration, it is likely that more synchronization logic and transformation codes associated with PALM PILOT devices will be cached by proxy 1 and more synchronization logic and transformation codes associated with Windows CE™ devices, will be cached by proxy 2 as time goes by. Upon receiving a sync request (601), a sync proxy instead of just checking the load (602), may also check for the device type and, if it does not specialize in this device type, it may forward the request to the proxy specializing in this device type. For example, proxy 1, upon receiving a sync request from a Windows CE™ device, may forward this request to proxy 2 which specializes in data synchronization for Windows CE™ and therefore is more likely to have cached up-to-date sync logic and transformation codes needed to perform this sync request.

Instead of a pre-configured specialization division scheme as described above, the sync proxies may among themselves broadcast their caching situation dynamically, similar to the load condition that they share among each other. This way, each sync proxy can dynamically forward a sync request to another sync proxy where the caching condition is more favorable for processing this request.

A preferred embodiment of the present invention includes features that can be implemented as software tangibly embodied on a computer program product or program storage device for execution on a CPU (201, 301) provided with the client (101, 102) and server (105–107). For example, software implemented in a popular object-oriented computer executable code such as Sun's JAVA™ provides portability across different platforms. Those skilled in the art will appreciate that other procedure-oriented and object-oriented (OO) programming environments, including but not limited to C++ and Smalltalk can also be employed.

Those skilled in the art will also appreciate that methods of the present invention may be implemented as software for execution on a computer or other processor-based device. The software may be embodied on a magnetic, electrical, optical, or other persistent program and/or data storage device, including but not limited to: magnetic disks, DASD, bubble memory; tape; optical disks such as CD-ROMs and DVD (digital video disks); and other persistent (also called nonvolatile) storage devices such as core, ROM, PROM, flash memory, or battery backed RAM. Those skilled in the art will appreciate that within the spirit and scope of the present invention, one or more of the components instantiated in the memory (203) of the client (101,102) or server (105–107) could be accessed and maintained directly via disk (302), storage memory (202), the network (108), another server, or could be distributed across a plurality of servers.

While we have described our preferred embodiments of our invention, it will be understood that those skilled in the art, both now and in the future, may implement various equivalents, improvements and enhancements which fall within the scope of the appended claims. Accordingly, these claims should be construed to maintain the proper protection for the invention first disclosed.

What is claimed is:

1. An adaptive sync server for synchronizing data between a client and a remote host replica, which stores a replica of data on the client, comprising:

sync acceptor logic for identifying a replica host and a sync logic which is application specific to a data type associated with the client and the remote host; wherein the sync logic can be located anywhere on a network remote to the sync server and the remote host, in response to a sync request; and sync handler logic, coupled to the sync acceptor logic, for retrieving remote sync logic from the network, connecting to the remote host and synchronizing the data between the client and the remote host using retrieved sync logic.

2. The server of claim 1, wherein the sync acceptor logic further comprises means for receiving from the client the sync request including information for identifying the replica host and the remote sync logic.

3. The server of claim 1, wherein the sync logic comprises means for one or more of: resolving a conflict; specifying an overriding direction; and taking certain actions to fulfill a specific need of the application.

4. The server of claim 1, wherein the sync request includes an address of a directory service storing information for identifying the replica host and the sync logic; and the sync handler logic further comprises means for retrieving the information, in response to the sync request.

5. The server of claim 1, wherein the sync request includes information for identifying a device specific transformation code for converting data between the client and the remote host during synchronization; and the sync handler logic comprises means for retrieving the transformation code based on the information and converting the data between the client and the remote host based on the device specific transformation code.

6. The server of claim 5, wherein the device specific transformation code can be remotely located anywhere on the network.

7. The server of claim 5, wherein the sync request includes an address of a directory service storing information for identifying the device specific transformation code for transforming the data between the client and the remote host; and the sync handler logic comprises means for retrieving remote transformation code based on the information and converting the data between the client and the remote host based on the device specific transformation code.

8. The server of claim 5, wherein the transformation code comprises means for one or more of filtering; transforming; and changing the data so that it can be used and processed in different computing devices having one or more of different CPU powers, memory capacities, and physical constructs.

9. The server of claim 1, further comprising:

cache manager means, coupled to the sync handler, for retrieving and storing the sync logic into a cache memory.

10. The server of claim 9, wherein said cache manager means further comprises means for presetting and storing the sync logic into the cache memory.

11. The server of claim 1, wherein identifying information comprises a URL.

12. The server of claim 11, wherein the network is the world wide web and the sync server is a proxy server and wherein the client is selected from a group consisting of handheld device; a smart phone, or an intelligent pager.

13. An adaptive sync server for synchronizing data between a client and a remote host replica, which stores a replica of data on the client, comprising:

sync acceptor logic for identifying a replica host and a sync logic which is application specific to a data type associated with the client and the remote host; wherein the sync logic can be located anywhere on a network remote to the sync server and the remote host, in response to a sync request;

sync handler logic, coupled to the sync acceptor logic, for retrieving remote sync logic from the network, connecting to the remote host and synchronizing the data between the client and the remote host using retrieved sync logic;

a load manager, coupled to the acceptor logic, for monitoring a server computation load and a server computation capacity and sharing the computation load and the computation capacity with collaborating sync servers; and said load manager comprising logic for diverting the sync request to a less loaded server, when the server computation load exceeds a threshold.

14. The server of claim 13, wherein the network includes one or more of an intranet and Internet wherein the transformation code further comprises means for filtering an image or transforming a resolution of the image included in a web page sent from the remote host to the handheld device so that the page can be shown on a screen on the handeld device within the memory constraints of the handheld device.

15. An adaptive server for transforming data between a client and a remote host replica, which stores a replica of data on the client, comprising:

sync acceptor logic for identifying the remote replica host and a device specific transformation code for transforming the data on the remote host to that of a device type associated with the client, wherein the transformation code can be located anywhere on a network remote to the sync server and the remote host, in response to a sync request; and sync handler logic, coupled to the sync acceptor logic, for retrieving remote transformation code and transforming the data between the client and the remote host based on the device specific transformation code.

16. The server of claim 15, wherein the sync acceptor logic further comprises means for receiving from the client the sync request including information for identifying the replica host and the remote transformation code.

17. The server of claim 15, wherein the sync request includes an address of a directory service storing information for identifying the replica host and the transformation code; and the sync handler logic further comprises means for retrieving the information, in response to the sync request.

18. The server of claim 15, wherein the transformation code comprises means for one or more of filtering; transforming; and changing the data so it can be used and processed in different computing devices having one or more of different CPU powers, memory capacities, and physical constructs.

19. The server of claim 15, wherein the transformation code further comprises means for filtering an image or transforming a resolution of the image included in a web page sent from the remote host to the handheld device so that the page can be shown on a screen on the handeld device within the memory constraints of the handheld device.

20. The server of claim 15, wherein the sync request includes information for identifying a sync logic which is application specific to a data type associated with the client and the remote host, in response to a sync request; and the sync handler logic comprising means for retrieving the sync logic, connecting to the remote host based on the information, and synchronizing the data between the client and the remote host.

21. The server of claim 20, wherein the sync logic comprises means for one or more of: resolving a conflict; specifying an overriding direction; and taking certain actions to fulfill a specific need of the application.

22. The server of claim 20, wherein the sync logic can be remotely located anywhere on the network.

23. The server of claim 22, wherein the sync request includes an address of a directory service storing information for identifying the sync logic; and the sync handler logic comprises means for retrieving remote sync logic based on the information and synchronizing the data between the client and the remote host based on the sync logic.

24. The server of claim 15, further comprising:

cache manager means, coupled to the sync handler, for retrieving and storing the sync logic into a cache memory.

25. The server of claim 24, wherein said cache manager means further comprises means for presetting and storing the sync logic into the cache memory.

26. The server of claim 15, wherein identifying information comprises a URL.

27. The server of claim 26, wherein the network is the world wide web and the sync server is a proxy server and wherein the client is selected from a group consisting of handheld device; a smart phone, or an intelligent pager.

28. An adaptive sync server for transforming data between a client and a remote host replica, which stores a replica of data on the client, comprising:

sync acceptor logic for identifying the remote replica host and a device specific transformation code for transforming the data on the remote host to that of a device type associated with the client, wherein the transformation code can be located anywhere on a network remote to the sync server and the remote host, in response to a sync request;

sync handler logic, coupled to the sync acceptor logic, for retrieving remote transformation code and transforming the data between the client and the remote host based on the device specific transformation code;

a load manager, coupled to the acceptor logic, for monitoring a server computation load and a server computation capacity and sharing the computation load and the computation capacity with collaborating sync servers; and said load manager comprising logic for diverting the sync request to a less loaded server, when the server computation load exceeds a threshold.

29. A client device adapted for connection to a sync server wherein synchronization of data is performed between the client and a remote host replica storing a replica of the data on the client, comprising:

a central processing unit (CPU);

a memory, coupled to the CPU, storing executable code for execution on the CPU, said code comprising:

a sync initiator for communicating to a sync server a sync request for identifying the replica host and a sync logic which is application specific to a data type associated with the client and the remote host; wherein the sync logic can be located anywhere on a network remote to the sync server and the remote host; and sync handler logic, coupled to the sync initiator logic, for communicating synchronized data with the remote host via the sync server; and a data manager, coupled to the sync handler, for processing one or more of data management and replica management functions.

30. The client of claim 29, wherein the client is a disconnectable handheld device selected from a group consisting of handheld computer; a smart phone, or an intelligent pager, comprising means for establishing a connection to the network.

31. The client of claim 29, wherein the data management comprise one or more of reading a data item; writing a data item; updating a data item; and deleting a data item.

32. The client of claim 29, further comprising means for communicating version and update history information between the client and the remote replica host.

33. The client of claim 29, wherein the sync request further comprises information for identifying the replica host and the remote sync logic.

34. The client of claim 29, wherein the sync request includes an address of a directory service storing information for identifying the replica host and the sync logic.

35. The client of claim 29, wherein the sync request includes information for identifying a device specific transformation code for transforming data between the client and the remote host.

36. The client of claim 35, wherein the device specific transformation code can be remotely located anywhere on the network.

37. The client of claim 35, wherein the sync request includes an address of a directory service storing information for identifying one or more of sync logic and the device specific transformation code for transforming the data between the client and the remote host.

38. The client of claim 35, wherein the client is a handheld device disconnectably coupled to one or more of an intranet and Internet wherein the data includes an image included in a web page sent from the remote host to the handheld device transformed so that the page can be shown on a screen of the handeld device within the memory constraints of the handheld device.

39. The client of claim 29, wherein identifying information comprises a URL.

40. The client of claim 29, wherein the request includes one or more network addresses of the sync server stored in the memory wherein one sync server address is pre-configured as a default sync server address.

41. The client of claim 29, wherein the request includes identification information about the client or a user selected from a group consisting of one or more of: a user ID; an encrypted password; shared secret information for authentication and authorization; a device type; or a system type associated with the client.

42. The client of claim 29, wherein the sync initiator is adapted for determining a list of applications needed to be synchronized, said applications selected from a group consisting of one or more of: an address book application; a memo pad application; a calendar application; an e-mail application.

43. A client device adapted for connection to an adaptive server wherein transformation of data is performed between the client and a remote host replica storing a replica of the data on the client, comprising:

a central processing unit (CPU);

a memory, coupled to the CPU, storing executable code for execution on the CPU, said code comprising:

a sync initiator for communicating to the server a request for identifying the replica host and a device specific transformation code for transforming data between the client and the remote host; wherein the transformation code can be located anywhere on a network remote to the server and the remote host; and sync handler logic, coupled to the sync initiator logic, for communicating transformed data with the remote host via a remote server; and a data manager, coupled to the sync handler, for processing one or more of data management and replica management functions.

44. The client of claim 43, wherein the client is a disconnectable handheld device selected from a group consisting of handheld computer; a smart phone, or an intelligent pager, comprising means for establishing a connection to the network.

45. The client of claim 43, wherein the sync request further comprises information for identifying the replica host and the transformation code.

46. The client of claim 43, wherein the sync request includes an address of a directory service storing information for identifying the replica host and the transformation code.

47. The client of claim 43, wherein the request includes information for identifying a sync logic which is application specific to a data type associated with the client and the remote host.

48. The client of claim 47, wherein the sync logic can be located anywhere on a network remote to the server and the remote host.

49. The client of claim 47, wherein the sync request includes an address of a directory service storing information for identifying one or more of the sync logic and the device specific transformation code.

50. The client of claim 47, wherein the client is a handheld device disconnectably coupled to one or more of an intranet and Internet wherein the data includes an image included in a web page sent from the remote host to the handheld device transformed so that the page can be shown on a screen of the handeld device within the memory constraints of the handheld device.

51. The client of claim 43, wherein identifying information comprises a URL.

52. The client of claim 43, wherein the request includes one or more network addresses of the server stored in the memory wherein one server address is pre-configured as a default server address.

53. The client of claim 43, wherein the request includes identification information about the client or a user selected from a group consisting of one or more of: a user ID; an encrypted password; shared secret information for authentication and authorization; a device type; or a system type associated with the handheld.

54. The client of claim 47, wherein the sync initiator is adapted for determining a list of applications needed to be synchronized, said applications selected from a group consisting of one or more of: an address book application; a memo pad application; a calendar application; an e-mail application.

55. In an adaptive sync server, a method for adaptively synchronizing data between a client and a remote host replica storing a replica of data on the client, the method comprising the steps of:

identifying a replica host and a sync logic which is application specific to a data type associated with the client and the remote host; wherein the sync logic can be located anywhere on a network remote to the sync server and the remote host, in response to a sync request;

retrieving remote sync logic from the network based on the request; and connecting to the remote host and synchronizing the data between the client and the remote host using retrieved remote sync logic.

56. The method of claim 55, further comprising the steps of:

receiving from the client the sync request including information for identifying the replica host and the remote sync logic.

57. The method of claim 55, wherein the sync logic further comprising the steps selected from the group consisting of one or more of: resolving a conflict; specifying an overriding direction; and taking certain actions to fulfill a specific need of the application.

58. The method of claim 55, wherein the sync request includes an address of a directory service storing information for identifying the replica host and the sync logic, further comprising the step of retrieving the information, in response to the sync request.

59. The method of claim 55, wherein the sync request includes information for identifying a device specific transformation code for converting data between the client and the remote host during synchronization, further comprising the steps of:

retrieving the transformation code based on the information; and converting the data between the client and the remote host based on the device specific transformation code.

60. The method of claim 59, wherein the device specific transformation code can be remotely located anywhere on the network.

61. The method of claim 59, wherein the sync request includes an address of a directory service storing information for identifying the device specific transformation code for transforming the data between the client and the remote host, further comprising the steps of:

retrieving remote transformation code based on the information; and converting the data between the client and the remote host based on the device specific transformation code.

62. The method of claim 59, wherein the transformation code further comprises steps selected from the group consisting of one or more of: filtering; transforming; and changing the data for use and processing in different computing devices having one or more of different CPU powers, memory capacities, and physical constructs.

63. The method of claim 55, further comprising the steps of retrieving and storing the sync logic into a cache memory.

64. The method of claim 63, further comprising the steps of presetting and storing the sync logic into the cache memory.

65. The method of claim 55, wherein identifying information comprises a URL.

66. In an adaptive sync server, a method for synchronizing data between a client and a remote host replica, storing a replica of data on the client, the method comprising the steps of:

identifying a replica host and a sync logic which is application specific to a data type associated with the client and the remote host; wherein the sync logic can be located anywhere on a network remote to the sync server and the remote host, in response to a sync request;

retrieving remote sync logic from the network based on the request;

connecting to the remote host and synchronizing the data between the client and the remote host using retrieved sync logic;

monitoring a server computation load and a server computation capacity;

sharing the computation load and the computation capacity with collaborating sync servers; and diverting the sync request to a less loaded server, when the server computation load exceeds a threshold.

67. The method of claim 66, wherein the network includes one or more of an intranet and Internet wherein the transformation code further comprises steps selected from the group consisting of one or more of: filtering an image; or transforming a resolution of the image included in a web page sent from the remote host to the handheld device so that the page can be shown on a screen on the handeld device within the memory constraints of the handheld device.

68. In an adaptive server, a method for transforming data between a client and a remote host replica storing a replica of data on the client, further comprising the steps of:

identifying the remote host replica and a device specific transformation code for transforming the data on the remote host to that of a device type associated with the client, wherein the transformation code can be located anywhere on a network remote to the server and the remote host, in response to a request; and retrieving remote transformation code, in response to the request; and transforming the data between the client and the remote host based on the device specific transformation code.

69. The method of claim 68, further comprising the step of receiving from the client, the request including information for identifying the replica host and the remote transformation code.

70. The method of claim 68, wherein the request includes an address of a directory service storing information for identifying the replica host and the transformation code, further comprising the step of retrieving the information, in response to the request.

71. The method of claim 68, wherein the transformation code further comprising the steps selected from the group consisting of one or more of filtering; transforming; and changing the data for use and processing in different computing devices having one or more of different CPU powers, memory capacities, and physical constructs.

72. The method of claim 68, wherein the transformation code further comprising the steps selected from the group consisting of one or more of:

filtering an image; or transforming a resolution of the image included in a web page sent from the remote host to the handheld device so that the page can be shown on a screen of the handeld device within the memory constraints of the handheld device.

73. The method of claim 68, wherein the request includes information for identifying a sync logic which is application specific to a data type associated with the client and the remote host, in response to a sync request, further comprising the steps of:

retrieving the sync logic;

connecting to the remote host based on the information; and synchronizing the data between the client and the remote host.

74. The method of claim 73, wherein the sync logic further comprising the steps selected from the group consisting of one or more of: resolving a conflict; specifying an overriding direction; or taking certain actions to fulfill a specific need of the application.

75. The method of claim 73, wherein the sync logic can be remotely located anywhere on the network.

76. The method of claim 75, wherein the request includes an address of a directory service storing information for identifying the sync logic, further comprising the steps of:
retrieving remote sync logic based on the information; and
synchronizing the data between the client and the remote host based on the sync logic.

77. The method of claim 68, further comprising the steps of retrieving and storing the sync logic into a cache memory.

78. The method of claim 77, further comprising the steps of: presetting and storing the sync logic into the cache memory.

79. The method of claim 68, wherein identifying information comprises a URL.

80. The method of claim 79, wherein the network is the world wide web and the sync server is a proxy server and wherein the client is selected from a group consisting of handheld device; a smart phone, or an intelligent pager.

81. The method of claim 68, wherein the network is the world wide web and the sync server is a proxy server and wherein the client is selected from a group consisting of handheld device; a smart phone, or an intelligent pager.

82. In an adaptive sync server for transforming data between a client and a remote host replica storing a replica of data on the client, comprising the steps of:
identifying the remote host replica and a device specific transformation code for transforming the data on the remote host to that of a device type associated with the client, wherein the transformation code can be located anywhere on a network remote to the sync server and the remote host, in response to a sync request;
retrieving remote transformation code, in response to the request;
transforming the data between the client and the remote host based on the device specific transformation code;
monitoring a server computation load and a server computation capacity;
sharing the computation load and the computation capacity with collaborating sync servers; and
diverting the sync request to a less loaded server, when the server computation load exceeds a threshold.

83. A program storage device readable by a machine, tangibly embodying a program of instructions executable by a sync server to perform method steps for adaptively synchronizing data between a client and a remote host replica storing a replica of data on the client, said method steps comprising:
identifying a replica host and a sync logic which is application specific to a data type associated with the client and the remote host; wherein the sync logic can be located anywhere on a network remote to the sync server and the remote host, in response to a sync request;
retrieving remote sync logic from the network; and
connecting to the remote host and synchronizing the data between the client and the remote host using retrieved remote sync logic.

84. The program storage device of claim 83, further comprising the steps of:
receiving from the client the sync request including information for identifying the replica host and the remote sync logic.

85. The program storage device of claim 83, the sync logic further comprising steps selected from the group consisting of one or more of: resolving a conflict; specifying an overriding direction; and taking certain actions to fulfill a specific need of the application.

86. The program storage device of claim 83, wherein the sync request includes an address of a directory service storing information for identifying the replica host and the sync logic, further comprising the step of retrieving the information, in response to the sync request.

87. The program storage device of claim 83, wherein the sync request includes information for identifying a device specific transformation code for converting data between the client and the remote host during synchronization, further comprising the steps of:
retrieving the transformation code based on the information; and
converting the data between the client and the remote host based on the device specific transformation code.

88. The program storage device of claim 87, wherein the device specific transformation code can be remotely located anywhere on the network.

89. The program storage device of claim 87, wherein the sync request includes an address of a directory service storing information for identifying the device specific transformation code for transforming the data between the client and the remote host, further comprising the steps of:
retrieving remote transformation code based on the information; and
converting the data between the client and the remote host based on the device specific transformation code.

90. The program storage device of claim 87, wherein the transformation code further comprises steps selected from the group consisting of one or more of: filtering; transforming; and changing the data for use and processing in different computing devices having one or more of different CPU powers, memory capacities, and physical constructs.

91. The program storage device of claim 83, wherein the network includes one or more of an intranet and Internet wherein the transformation code further comprises steps selected from the group consisting of one or more of: filtering an image; or transforming a resolution of the image included in a web page sent from the remote host to the handheld device so that the page can be shown on a screen on the handeld device within the memory constraints of the handheld device.

92. The program storage device of claim 83, further comprising the steps of retrieving and storing the sync logic into a cache memory.

93. The program storage device of claim 92, further comprising the steps of presetting and storing the sync logic into the cache memory.

94. The program storage device of claim 83, wherein identifying information comprises a URL.

95. A program storage device readable by machine, tangibly embodying a program of instructions executable by a sync server, to perform method steps for adaptively synchronizing data between a client and a remote host replica storing a replica of data on the client, the method comprising the steps of:
identifying a replica host and a sync logic which is application specific to a data type associated with the client and the remote host; wherein the sync logic can be located anywhere on a network remote to the sync server and the remote host, in response to a sync request;

retrieving remote sync logic from the network based on the request;

connecting to the remote host and synchronizing the data between the client and the remote host using retrieved sync logic;

monitoring a server computation load and a server computation capacity;

sharing the computation load and the computation capacity with collaborating sync servers; and diverting the sync request to a less loaded server, when the server computation load exceeds a threshold.

96. A program storage device readable by a machine, tangibly embodying a program of instructions executable by a server to perform method steps for adaptively transforming data between a client and a remote host replica storing a replica of data on the client, said method steps comprising:

identifying the remote host replica and a device specific transformation code for transforming the data on the remote host to that of a device type associated with the client, wherein the transformation code can be located anywhere on a network remote to the sync server and the remote host, in response to a request; and retrieving remote transformation code; and transforming the data between the client and the remote host based on the device specific transformation code.

97. The program storage device of claim 96, further comprising the step of receiving from the client the request including information for identifying the replica host and the remote transformation code.

98. The program storage device of claim 96, wherein the request includes an address of a directory service storing information for identifying the replica host and the transformation code, further comprising the step of retrieving the information, in response to the request.

99. The program storage device of claim 96, wherein the transformation code further comprising the steps selected from the group consisting of one or more of filtering; transforming; and changing the data for use and processing in different computing devices having one or more of different CPU powers, memory capacities, and physical constructs.

100. The program storage device of claim 96, wherein the transformation code further comprising the steps selected from the group consisting of one or more of:

filtering an image; or transforming a resolution of the image included in a web page sent from the remote host to the handheld device so that the page can be shown on a screen of the handeld device within the memory constraints of the handheld device.

101. The program storage device of claim 96, wherein the request includes information for identifying a sync logic which is application specific to a data type associated with the client and the remote host, in response to a sync request, further comprising the steps of:

retrieving the sync logic;

connecting to the remote host; and synchronizing the data between the client and the remote host.

102. The program storage device of claim 101, wherein the sync logic further comprising the steps selected from the group consisting of one or more of: resolving a conflict; specifying an overriding direction; or taking certain actions to fulfill a specific need of the application.

103. The program storage device of claim 101, wherein the sync logic can be remotely located anywhere on the network.

104. The program storage device of claim 103, wherein the sync request includes an address of a directory service storing information for identifying the sync logic, further comprising the steps of:

retrieving remote sync logic based on the information; and synchronizing the data between the client and the remote host based on the sync logic.

105. The program storage device of claim 96, further comprising the steps of retrieving and storing the transformation code into a cache memory.

106. The program storage device of claim 105, further comprising the steps of presetting and storing the transformation code into the cache memory.

107. The program storage device of claim 96, wherein identifying information comprises a URL.

108. The program storage device of claim 107, wherein the network is the world wide web and the server is a proxy server and wherein the client is selected from a group consisting of handheld device; a smart phone, or an intelligent pager.

109. The program storage device of claim 96, wherein the network is the world wide web and the server is a proxy server and wherein the client is selected from a group consisting of handheld device; a smart phone, or an intelligent pager.

110. A program storage device readable by a machine, tangibly embodying a program of instructions executable by a server to perform method steps for adaptively transforming data between a client and a remote host replica storing a replica of data on the client, said method steps comprising:

identifying the remote host replica and a device specific transformation code for transforming the data on the remote host to that of a device type associated with the client, wherein the transformation code can be located anywhere on a network remote to the sync server and the remote host, in response to a sync request;

retrieving remote transformation code, in response to the request;

transforming the data between the client and the remote host based on the device specific transformation code;

monitoring a server computation load and a server computation capacity;

sharing the computation load and the computation capacity with collaborating sync servers; and diverting the sync request to a less loaded server, when the server computation load exceeds a threshold.

* * * * *